US007042897B1

(12) United States Patent
Sivaprakasam et al.

(10) Patent No.: US 7,042,897 B1
(45) Date of Patent: May 9, 2006

(54) MEDIUM ACCESS CONTROL LAYER PROTOCOL IN A DISTRIBUTED ENVIRONMENT

(75) Inventors: Srinivas Sivaprakasam, Milpitas, CA (US); Kamlesh Rath, Dublin, CA (US)

(73) Assignee: ARCWAVE, Inc, Fremont, CA (US)

( * ) Notice: Subject to any disclaimer, the term of this patent is extended or adjusted under 35 U.S.C. 154(b) by 949 days.

(21) Appl. No.: 09/828,339

(22) Filed: Apr. 5, 2001

(51) Int. Cl.
   *H04J 3/02* (2006.01)
(52) U.S. Cl. .................. 370/462; 370/338; 370/328; 370/447
(58) Field of Classification Search ............... 370/254, 370/328, 338, 431–463
   See application file for complete search history.

(56) References Cited

U.S. PATENT DOCUMENTS

| | | | | |
|---|---|---|---|---|
| 6,678,252 | B1 * | 1/2004 | Cansever | 370/253 |
| 6,690,678 | B1 * | 2/2004 | Basso et al. | 370/468 |
| 6,700,878 | B1 * | 3/2004 | Salloum Salazar et al. | 370/329 |
| 6,785,513 | B1 * | 8/2004 | Sivaprakasam | 455/63.1 |
| 6,788,950 | B1 * | 9/2004 | Raissinia et al. | 455/522 |
| 6,804,209 | B1 * | 10/2004 | Sugaya et al. | 370/328 |
| 6,836,469 | B1 * | 12/2004 | Wu | 370/322 |
| 6,845,106 | B1 * | 1/2005 | McKinnon et al. | 370/477 |
| 6,876,643 | B1 * | 4/2005 | Aggarwal et al. | 370/338 |

FOREIGN PATENT DOCUMENTS

WO    WO 00/59130    10/2000

OTHER PUBLICATIONS

S. Keshav: "An Engineering Approach to Computer Networking; ATM Networks, the Internet, and the Telephone Network" 1997 Addison-Wesley, USA XP002207112 p.134 and p. 135.

Rncamppha standard; RNA; 4381 BP; Sep. 30, 1993 (Rel. 37, Created) 05-Oct. 1993 (Rel. 37, Last Updated, Version 9).

* cited by examiner

*Primary Examiner*—Seema S. Rao
*Assistant Examiner*—Michael J. Moore

(57) ABSTRACT

A method for allocating resources of a shared medium in a large distributed network. The nodes make reservation requests in parallel during a series of reservation time slots. For each slot, one node of a pair transmits a request and the other listens. A node transmits its own requests and the requests of nodes from the request it received. The process repeats until all nodes have transmitted their requests for medium access, wherein one node knows the medium access requests of all the nodes in the network. In this fashion, 1024 nodes can make their requests in ten time slots. The last node may be a master node or may transmit to a master node or base station, which transmits a full or partial grant. Alternatively, the nodes may simultaneously transmit their requests to a master node, which passes the groups requests to a master node nearer the base station.

19 Claims, 26 Drawing Sheets

| Time | 402a | 402b | 402c | 402d | 402e | 402f | 402g | 402h |
|------|------|------|------|------|------|------|------|------|
| | | | | | Nodes | | | |
| TS1 | -90 dB | | | -60 dB | -70 dB | | -20 dB | |
| TS2 | | -90 dB | | | | | | |
| TS3 | | | | | | -40 dB | | -50 dB |
| TS4 | | | -50 dB | | | | | |

| Time | 402a | 402b | 402c | 402d | 402e | 402f | 402g | 402h |
|------|------|------|------|------|------|------|------|------|
| TS1 | 10, fa | fa | fb | 20, fb | 15, fc | fc | 30, fd | fd |
| TS2 | | 12, fa | fa | | | fb | | 15, fb |
| TS3 | | | fc | | | 25, fc | | |
| TS4 | | | 30, fd | | | | | |

Fig. 7

| Stream ID 1602 | Node ID 1604 | |
|---|---|---|
| Number of Resources Requested 1606 | Service Level ID 1608 | RSVD 1610 |

| | TS1 | TS2 | TS3 | TS4 | TS5 | TS6 | TS7 | TS8 | TS9 | TS10 | TS11 | TS12 |
|---|---|---|---|---|---|---|---|---|---|---|---|---|
| $U_{i-2}$ | | | Ru | Ru | Tu | Tu | | | Ru | Ru | Tu | Tu |
| $M_{i-2}$ | R | R | T | T | | | R | R | T | T | | |
| $D_{i-2}$ | | | Rd | Rd | Td | Td | | | Rd | Rd | Td | Td |
| $U_{i-1}$ | Tu | Tu | Ru | Ru | | | Tu | Tu | Ru | Ru | | |
| $M_{i-1}$ | | | T | T | R | R | | | T | T | R | R |
| $D_{i-1}$ | Td | Td | Rd | Rd | | | Td | Td | Rd | Rd | | |
| $U_i$ | | | Ru | Ru | Tu | Tu | | | Ru | Ru | Tu | Tu |
| $M_i$ | R | R | T | T | | | R | R | T | T | | |
| $D_i$ | | | Rd | Rd | Td | Td | | | Rd | Rd | Td | Td |
| $U_{i+1}$ | Tu | Tu | Ru | Ru | | | Tu | Tu | Ru | Ru | | |
| $M_{i+1}$ | | | T | T | R | R | | | T | T | R | R |
| $D_{i+1}$ | Td | Td | Rd | Rd | | | Td | Td | Rd | Rd | | |
| $U_{i+2}$ | | | Ru | Ru | Tu | Tu | | | Ru | Ru | Tu | Tu |
| $M_{i+2}$ | R | R | T | T | | | R | R | T | T | | |
| $D_{i+2}$ | | | Rd | Rd | Td | Td | | | Rd | Rd | Td | Td |

Fig. 17

MEDIUM ACCESS CONTROL LAYER PROTOCOL IN A DISTRIBUTED ENVIRONMENT

TECHNICAL FIELD

The present invention generally pertains to the field of medium access control (MAC) reservation protocols. More particularly, the present invention is related to a method for processing reservation requests for shared medium access in a parallel fashion, suitable for a network with many nodes.

BACKGROUND ART

When a network of nodes share a medium it is necessary to allocate medium resources between the nodes. When the number of nodes is relatively small, conventional allocation methods may work acceptably. However, with a network with many nodes conventional methods do not work well. One conventional method of reserving medium access is defined by the IEEE standard 802.11 Medium Access Control (MAC) specification. In that MAC specification, when a node wishes to transfer a packet of information it sends out a request to send (RTS). When the base station sees this, it sends out a clear to send (CTS). If a second node wishes to transfer a packet, it also sends an RTS. However, it will not get a CTS until the first node gets its CTS. Unfortunately, this linear technique is unsuitable for a network with a large number of nodes.

For example, if there are 1024 nodes in the network all making reservations on the shared medium using the standard IEEE 802.11 MAC protocol, the reservation protocol overhead will be unacceptable. The total time between the beginning of the RTS and the end of the CTS may be 50 microseconds. For example, if the RTS packet contains 100 bits, which are transferred at 10 Mbps, then the packet duration will be 10 microseconds. Additionally, each of the following may be 10 microseconds: CTS packet duration, propagation delay each way, and processing time. Thus, with approximately 1000 nodes, the total periodicity for the reservation polling is 50 ms, which is the minimum latency for any packet. Latency may be even higher due to other delays. Consequently, the overhead for reservation is 100 percent: 10 Mbps for the MAC protocol function and 10 Mbps for the data link that carries the data buffered over the 50 ms duration for all nodes participating.

Additionally, IEEE std. 802.11 MAC protocol does not support Synchronous Channel (SCH) operation. However, some networks carry voice and video traffic, which require such operation. Consequently, IEEE std. 802.11 is unsuitable for such networks.

Another conventional method of allocating medium resources is the Data Over Cable Service Interface Specification (DOCSIS). In this technique, downstream traffic is time-slotted; however, upstream traffic is random access. If a collision occurs when nodes are requesting an upstream transfer, then the nodes perform a backoff and retry. The backoff time is specified to increase as the frequency of collisions increases. Thus, with a large number of nodes placing requests, the backoff time may become very long. This conventional method works best for systems that have mostly downstream traffic and little upstream traffic. Additionally, it does not work well for synchronous transfers, and is thus not suitable for voice applications.

Thus, a need has arisen for a method for allocating resources in a large distributed network, which share a medium. A further need exists for a method that does not have a high overhead. A still further need exists for such a method that works well for a network with considerable upstream traffic. An even further need exists for such a method that, while providing for asynchronous medium reservations, allows for synchronous transfers as well.

SUMMARY

Embodiments of the present invention provide for a method for allocating resources of a shared medium in a large distributed network. The present invention provides for a method that does not have a high overhead. The present invention works well in a network with considerable upstream traffic. The present invention, while providing for asynchronous medium reservations, allows for synchronous transfers as well.

A method for allocating resources of a shared medium in a large distributed network is disclosed. In one embodiment, the nodes make their reservation requests in parallel during a series of reservation time slots. For each time slot, one node of a pair transmits a request and the other listens. During each time slot, approximately one half the nodes that have yet to broadcast their reservation requests transmit to a node that has yet to broadcast its request for resource allocation. A node transmits its own request and the medium allocation request of nodes from the request it received. Thus, with one embodiment, after the first time slot half the nodes have transmitted their resource allocation requests to the other half, and after two time slots three quarters of the nodes have transmitted to the other quarter. The process repeats until all nodes have transmitted their resource allocation requests, wherein one node knows the medium allocation requests of all the nodes in the network. In this fashion, 1024 nodes can make their requests in ten time slots. The last node may be a master node or may transmit to a master node or base station, which transmits a full or partial grant.

In another embodiment, the nodes are divided into groups, with each node transmitting its request to its group master node. Within the group, the nodes use a shared control channel to send requests on different sub-carries and different time-slots. The group master then consolidates its group's requests and passes them along to the next master node on the way to the base station.

In one embodiment, the master node transmits a resource allocation table to the network, describing the resources that are allocated to each node. In another embodiment, each node listens during the reservation time slots to the requests being made for sufficient information to determine which resources will be allocated to it. Thus, the master node or base station does not have to transmit a resource allocation table. However, in this embodiment the master node may transmit a scaling factor to tell each node what fraction of the requested resources it has been allocated. In another embodiment, the base station allocates resources on a per group basis. Then, each group master node divides the group's allocations among the nodes in the group.

In yet another embodiment, each node is assigned a primary and a secondary frequency from a number of broadcast frequencies. During a first time slot, all nodes which desire medium access transmit their request to a group master node on their assigned primary frequency. If a node fails to receive an acknowledgment from the master, it re-transmits its request on its secondary frequency. If this request does not get through, it continues to transmit on randomly determined frequencies of the available frequencies, during successive time slots.

Another embodiment provides for a method of adding a node to a network of nodes already a part of a parallel reservation scheme. In this embodiment, the new node listens on a number of pre-determined frequencies for each time slot. Thus, it is able to determine the power level at which it receives the signal from each other node in the network. The master node uses this information to determine a new network protocol. For example, it determines which nodes transmit and at what frequency and power for each time slot. It also determines which nodes listen and at what frequency for each time slot.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

FIG. 5 illustrates a table a new node sends to the master node when it wishes to join the network of nodes for the resource request process, according to an embodiment of the present invention.

FIG. 7 is a table illustrating a master node table used to describe the resource reservation request process, according to an embodiment of the present invention.

FIG. 16 is a diagram of an exemplary resource request, which nodes may transmit, in accordance with embodiments of the present invention.

FIG. 17 is a table of a receive-transmit protocol, in accordance with embodiments of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Medium Access Control Layer Protocol in a Distributed Environment

Figure 1A:
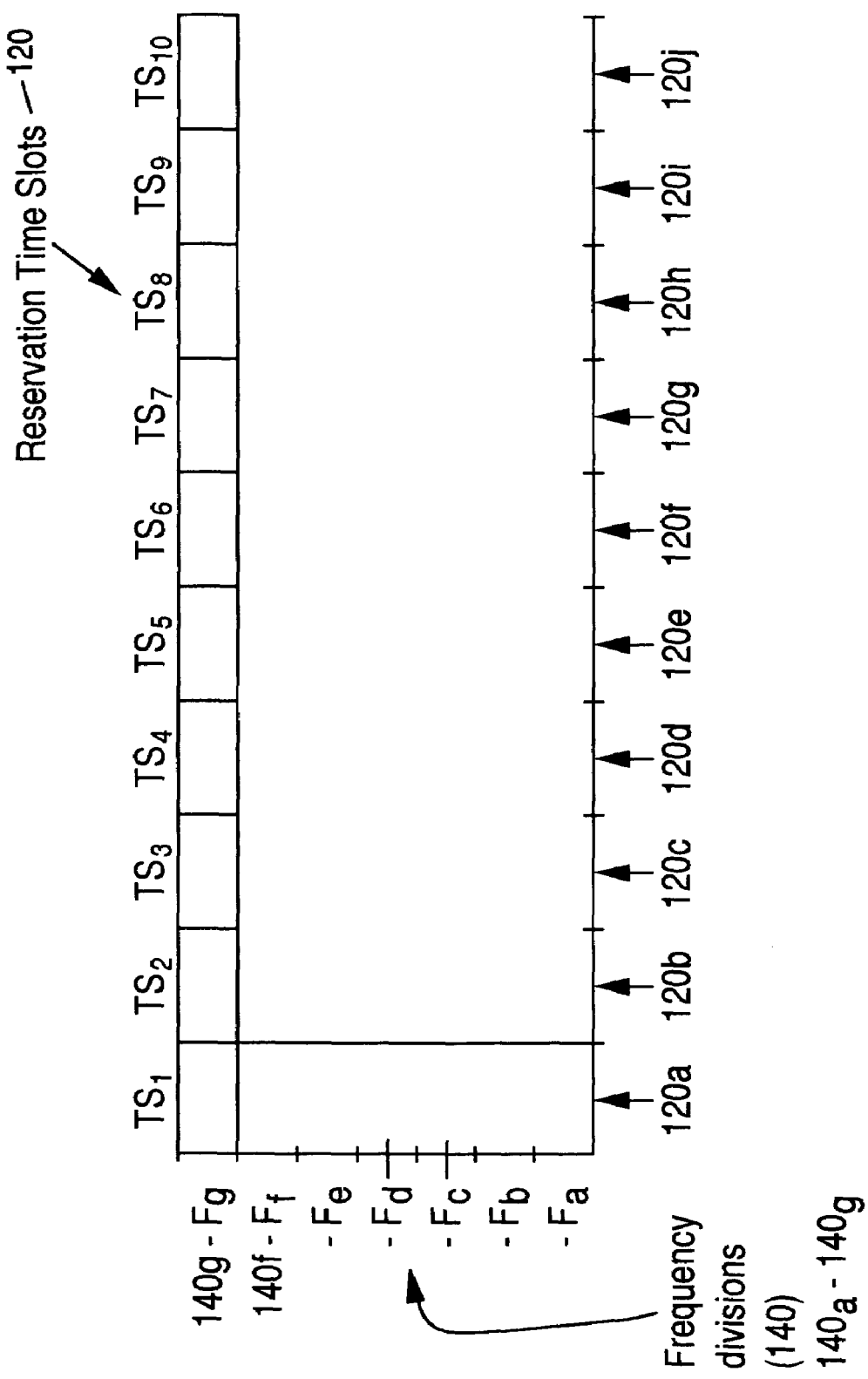
FIG. 1A is diagram illustrating a band of frequencies divided into time slots for reservation purposes, according to an embodiment of the present invention.

Referring to FIG. 1A, embodiments of the present invention provide for a frequency band that is set aside for medium reservation. This band may be broken into, for example, seven frequency divisions 140 (e.g., $f_A$–$f_G$ 140a–140g) on which nodes make their reservation requests. Furthermore, ten reservation time intervals (e.g., time slots) 120 are provided for (e.g., TS1–TS10, 120a–120j). Ten reservation time slots allow for 1024 nodes to make their requests, using an embodiment of the present invention (e.g., $1024=2^{10}$). However, the present invention is well suited to other numbers of reservation time slots 120.

Figure 1B:
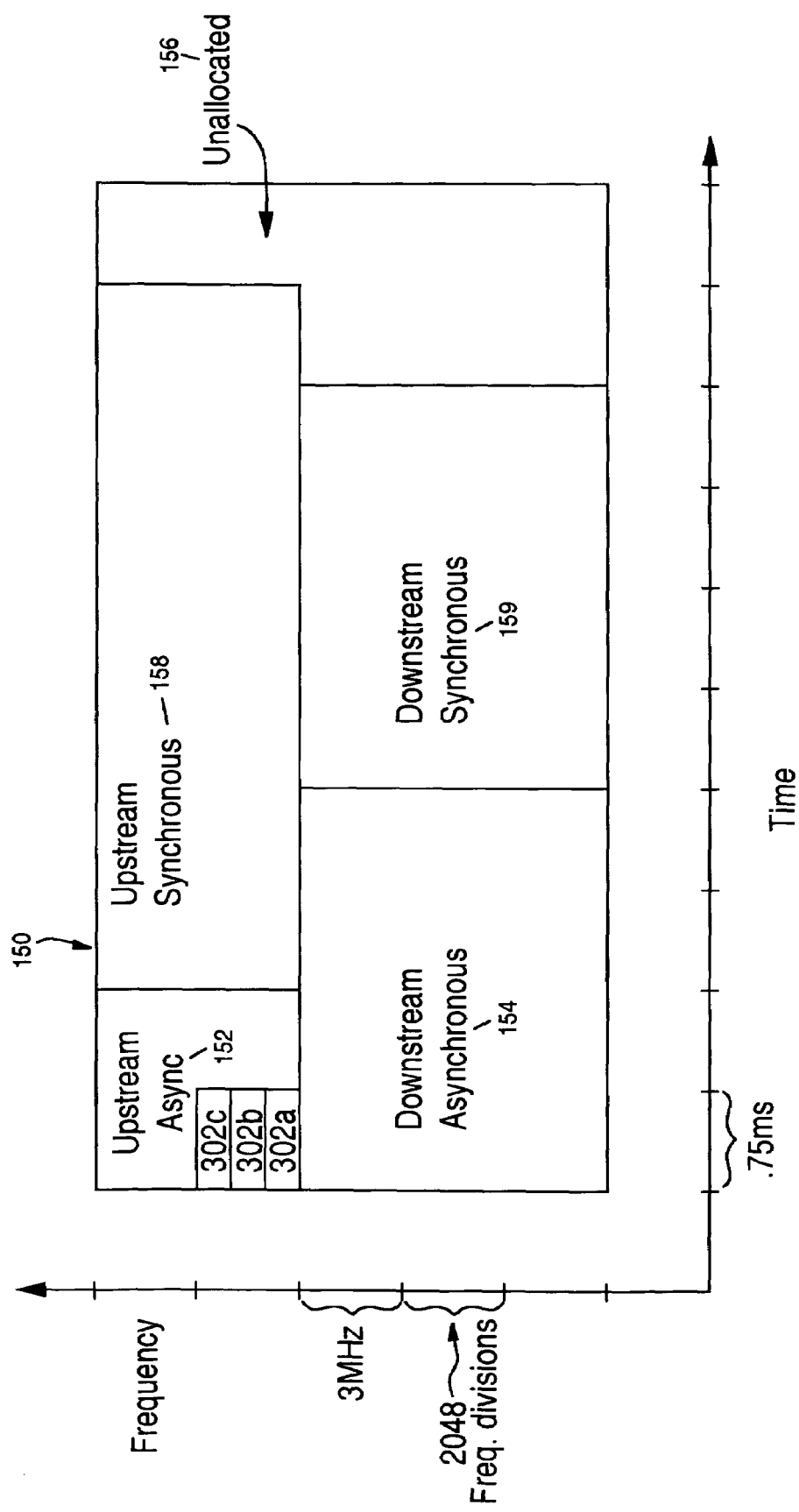
FIG. 1B is a diagram illustrating medium resources divided into frequency and time divisions, according to an embodiment of the present invention.

Embodiments of the present invention divide the resource space, to which the nodes are requesting access, into frequency and time, as shown in FIG. 1B. For example, the space 150 is divided into five bands of 3 MHz each. Each of those bands is sub-divided into 2048 channels, which are used for orthogonal frequency division multiplexing (OFDM). The time axis is divided into units of 0.75 ms. Thus, one resource comprises a unit of 0.75 ms by approximately 1500 Hz. The resource space 150 is divided into sections for upstream synchronous traffic 158, downstream synchronous traffic 159, upstream asynchronous traffic 152, downstream asynchronous traffic 154, and an unallocated 156 section.

The available resources are wavelet 302 groups. A wavelet 302 may be an OFDM sub-carrier in a specific time slot 120 that may be used to transport data bits. Embodiments of the present invention order the resource space 150 and the nodes. For example, the lowest resources are at point 302a and go up the frequency axis for the first 0.75 ms time slot 120a, where a time slot 120 may correspond to an OFDM symbol width. Next, the frequencies associated with the second time slot 120b are assigned. This minimizes the number of time slots 120 during which a node needs to transmit or receive during a frame. Thus, if node A requests two units, it will be assigned units (wavelets) 302a and 302b. If node B requests no resources and node C requests one resource, node C is assigned unit 302c. It will be understood that the wavelets 302 are not drawn according to scale.

Figure 2A:
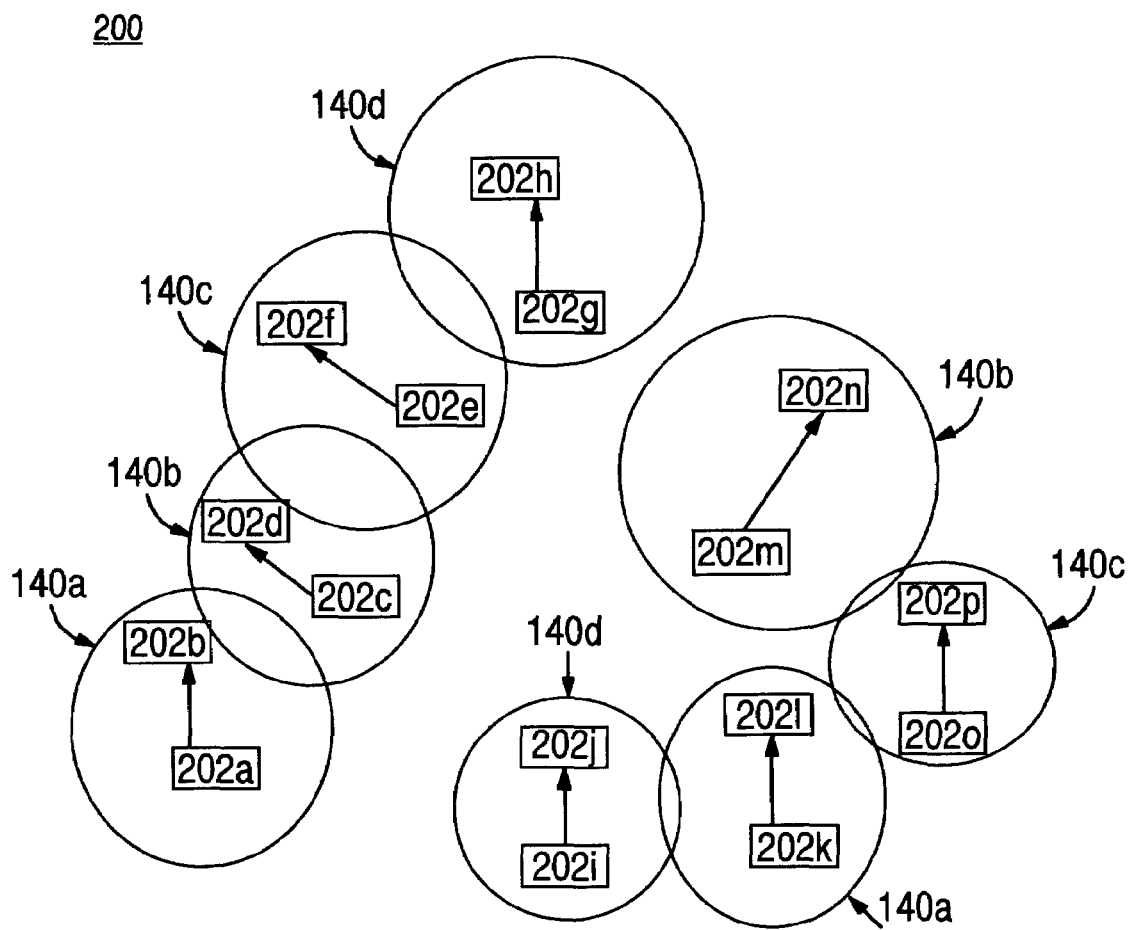
FIG. 2A, FIG. 2B, FIG. 2C, and FIG. 2D are illustrations of a network of nodes executing a parallel reservation protocol, according to an embodiment of the present invention.

Embodiments of the present invention provide for a process in which nodes simultaneously and independently reserve medium resources 150 (e.g., asynchronous upstream resources 152). While an example of allocating resources for a wireless medium is given, the present invention is well-suited to allocating medium access in a wireline medium, for example, cable or the like. FIGS. 2A through 2D illustrate nodes 202 in a network 200 broadcasting their medium allocation requests 210 (e.g., wavelet reservation packets 302), with FIG. 2A representing the nodal activity during the first time slot 120a, FIG. 2B the nodal activity during the second time slot 120b, and so on. In each case, some or all of the nodes 202 are paired, with one broadcasting and one receiving. Because many nodes 202 may broadcast in a single time slot 120, the requests of all sixteen nodes 202 can be known by a master node or a base-station in four time slots. (Some embodiments may use an extra time slot to transmit to a base station.) The network 200 is synchronized in both time and frequency, as will be well understood both those of ordinary skill in the art. The present invention is well-suited for a network 200 comprising more than 1000 nodes 202. However, the present invention may be used with any number of nodes 202. The performance advantages over conventional techniques is more significant in larger networks.

In one round of reservations, 262,144 wavelets 302 may be reserved. This includes 2048*8 frequency channels of 1500 Hz each and 10.67 ms of time (e.g., 16 OFDM slots). This may equate to 917,504 bits (e.g., assuming 3.5 bits per cycle). One-hundred microseconds of 10 Mbps is about 200 wavelets. Hence the overhead is 0.08%, and latency is 10.67 ms.

Exemplary Resource Request

FIG. 16 illustrates an exemplary resource request 1600, which the nodes transmit to indicate their desire for asynchronous upstream resource reservation, in one embodiment. The request 1600 comprises 16 bits to specify the MAC address. The first six bits indicate the node's stream identifier 1602, which identifies the stream within a hub or base station. The stream is more fully defined in co-pending U.S. patent application Ser. No. 09/828,349, now U.S. Pat. No. 6,785,513, concurrently filed herewith entitled, "Method and System for Clustered Wireless Networks", by Sivaprakasam, and assigned to the assignee of the present invention, which is hereby incorporated by reference in its entirety. The MAC address also has ten bits for the node identifier 1604. The request 1600 also contains eight bits for the encoded number of resources requested 1606, four bits for a service level identifier 1608, and four reserved bits 1610.

Parallel Reservation Scheme

Referring to FIG. 2A the network 200 of nodes comprises sixteen nodes 202 labeled 202a through 202p. The sixteen nodes 202 are divided into pairs, with one node 202 (e.g., node 202a) broadcasting and the other node 202 (e.g., node 202b) receiving. The broadcasting nodes 202 know that they are to broadcast during the first time slot 120a of the reservation period at a pre-determined frequency and power. The receiving nodes 202 know that they are to listen during the first time slot 120a at a pre-determined frequency. The transmitting node 202 need not know which node 202 is receiving. The arrows indicate a transfer of information from one node 202 to another. The actual transmission may be omni-directional. However, the present invention is not limited to omni-directional broadcasting. The order in which nodes 202 broadcast requests is static, unless nodes 202 are added or dropped from the network 200. Embodiments discussed herein cover those cases.

Still referring to FIG. 2A, more than one node 202 may transmit at a given frequency 140. The power level at which each node 202 transmits is selected such that the receiving node 202 will detect it, but it will not interfere with another node's reception. For example, node 202a and node 202k each transmit at frequency A 140a. Node 202b and node 202l will receive the proper signal without significant interference. However, the present invention does not require frequencies to be used by multiple nodes 202 during a single time slot 120.

Figure 2B:
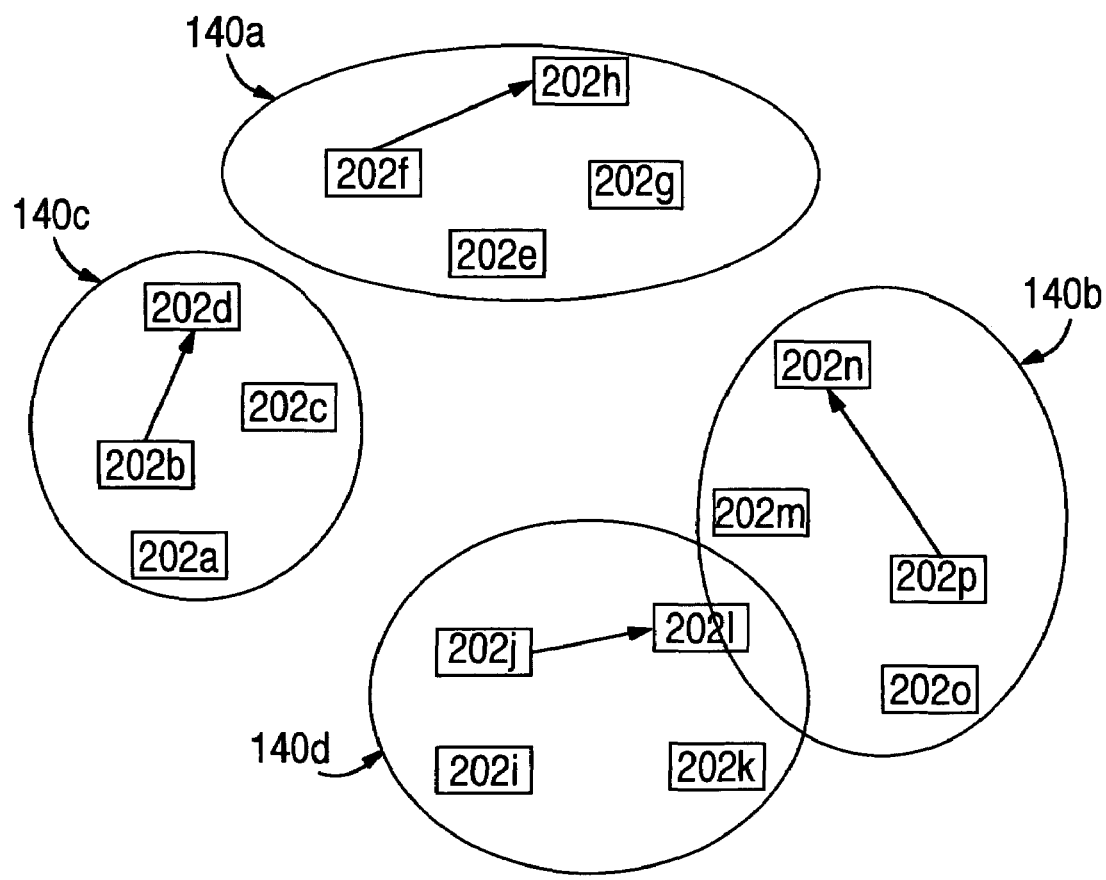

Referring now to FIG. 2B, only four nodes 202 are transmitting during the second reservation time slot 120b. Those nodes 202 transmit a wavelet reservation packet comprising their own medium allocation request along with the requests of the nodes 202 that transmitted in the first time slot 120a. For example, node 202b transmits to node 202d its requirements along with the requests from node 202a. In a like fashion, node 202f transmits to node 202h its request along with the request of node 202e, which it received in the first time slot 120a.

Still referring to FIG. 2B, each node 202 knows if it should be transmitting and, if so, at what power and frequency. The nodes 202 also know if they should receive, and at what frequency 140. However, not all nodes 202 must be receiving or transmitting. Nodes 202a, 202c, 202e, 202g, 202i, 202k, 202m, and 202o are not transmitting or receiving during this time slot 120b. As with time slot one 120a, more than one node 202 may transmit at a given frequency 140.

Figure 2C:
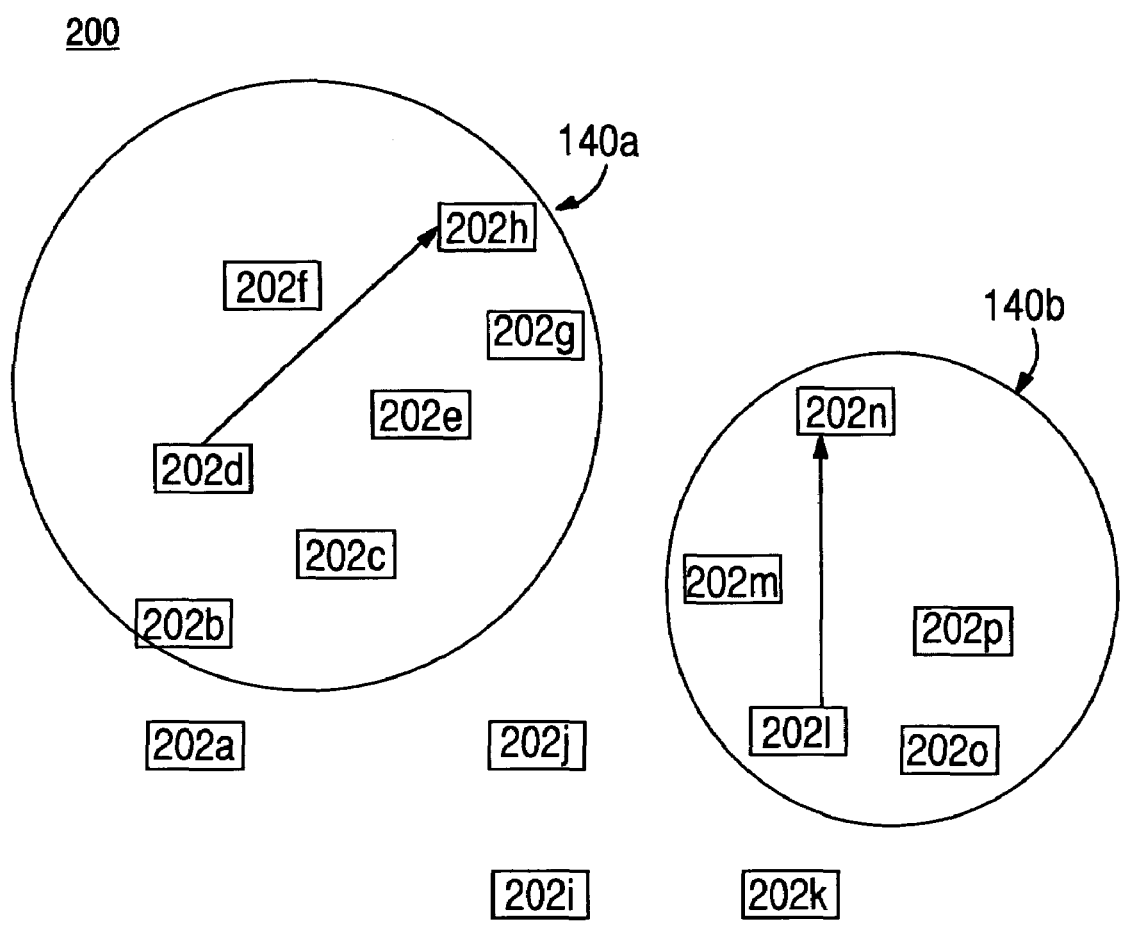

Referring now to FIG. 2C, representing the third reservation time slot 120c, node 202d is transmitting to node 202h its requests along with those of nodes 202a, 202b, and 202c. Node 202h already knows the requests of 202e, 202f, and 202g, and will transmit them in the next time slot 120d.

Figure 2D:
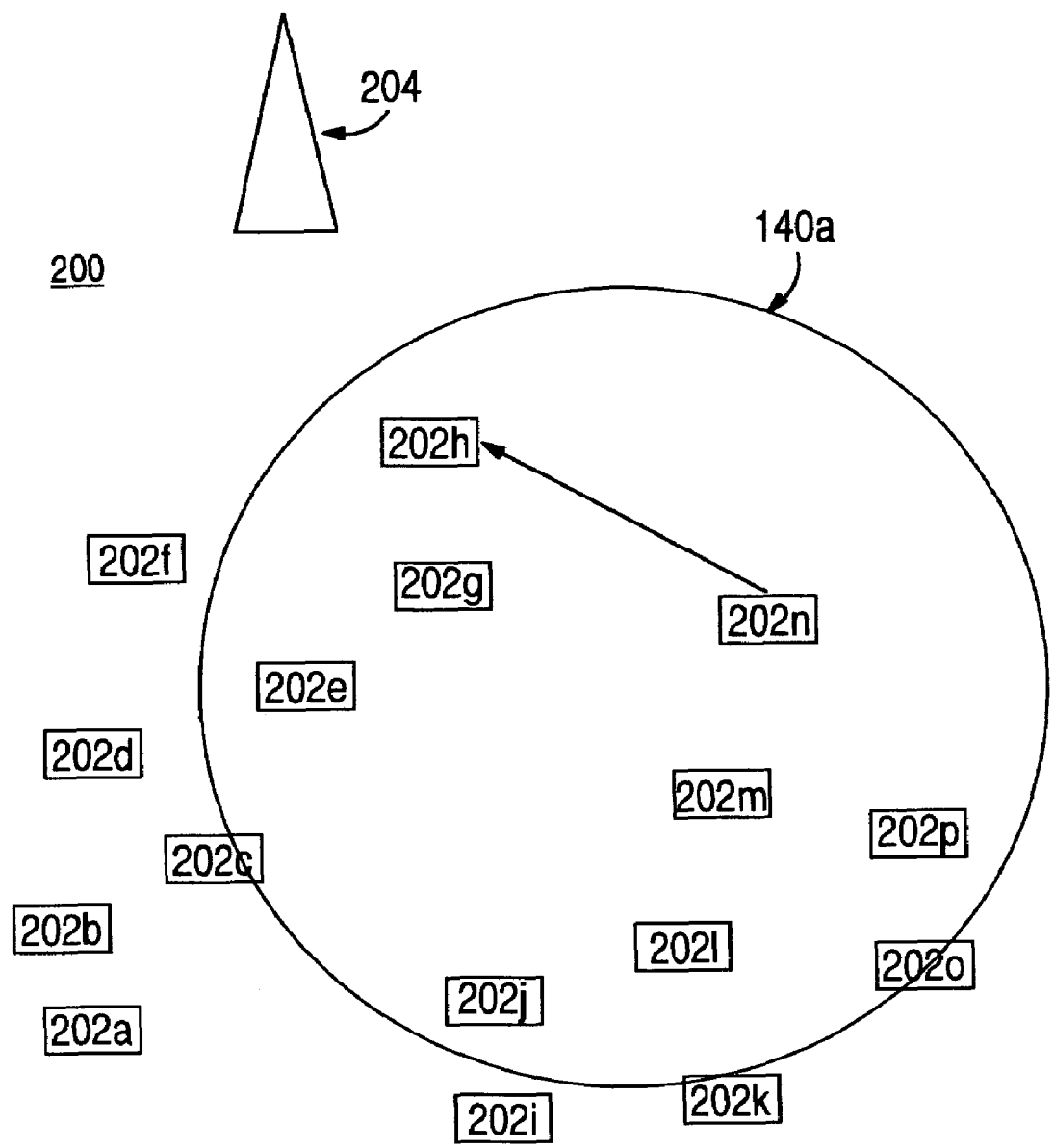

Referring now to FIG. 2D, representing the fourth reservation time slot 120d, node 202n transmits its requests, along with those it knows. Node 202h receives those, and from previous steps node 202h knows the requests of every node 202 in the network 200. If desired, node 202h may transmit to a base-station 204. Alternatively, node 202h may serve as a master node and grant all or a portion of the reservation requests.

In one embodiment, many or all of the nodes 202 transmit to the base station 204 together, using a coherent beam-forming process described in co-pending U.S. patent application Ser. No. 09/828,349, now U.S. Pat. No. 6,785,513, concurrently filed herewith entitled, "Method and System for Clustered Wireless Networks", by Sivaprakasam, and assigned to the assignee of the present invention. Thus, the nodes can transmit to a distant base station 204 with sufficient power.

While the example of FIG. 2A through FIG. 2D uses sixteen nodes, the present invention is not limited to operating with a network 200 in which the number of nodes 202 equals a power of two. Furthermore, a node 202 is not required to transmit a request at all, if it has no need for medium access.

Figure 3:
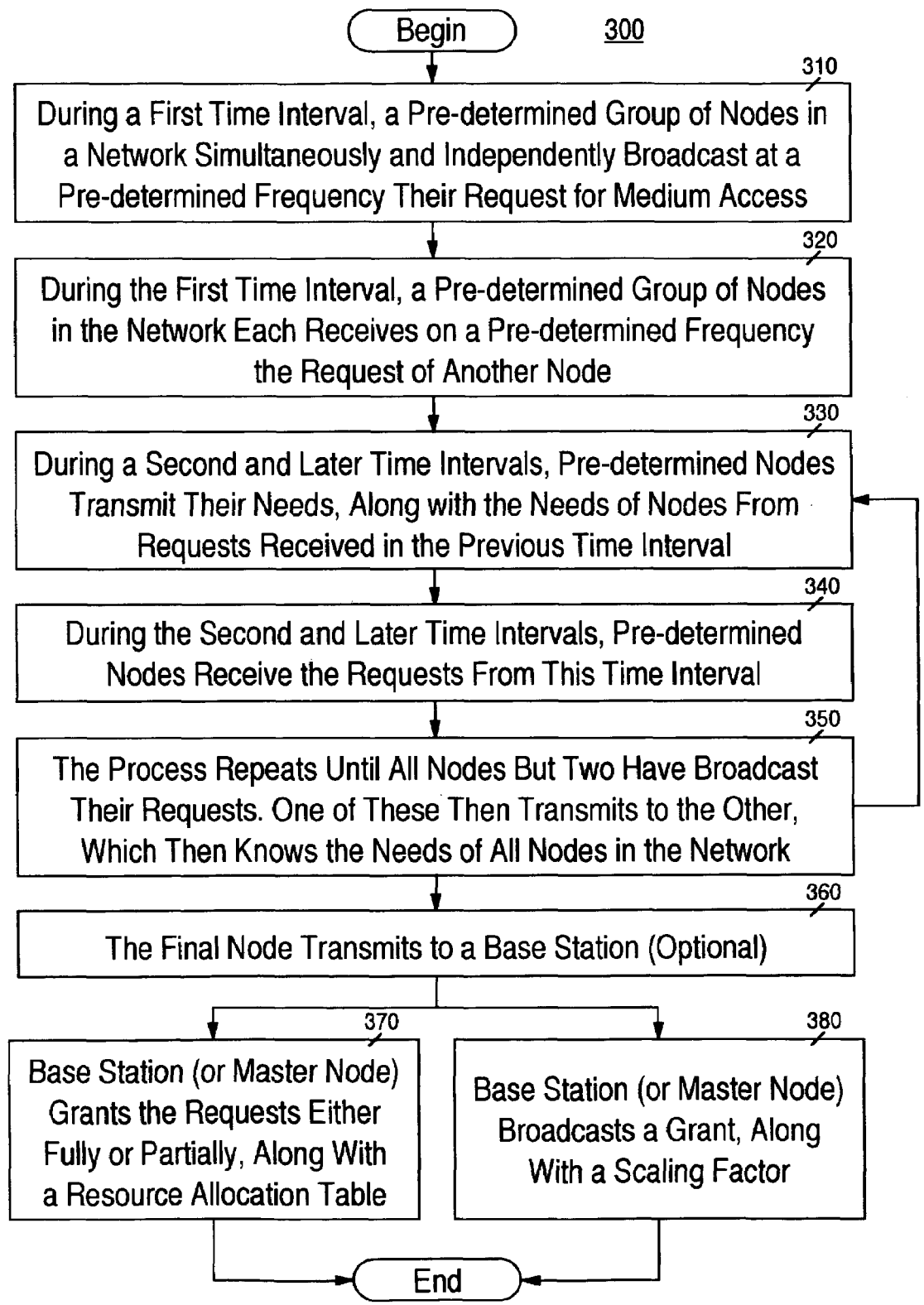
FIG. 3 is a flowchart illustrating the steps of a process of nodes reserving resources, according to an embodiment of the present invention.

The process which takes place in FIG. 2A through FIG. 2D may be described in the series of steps in the flowchart of FIG. 3. In step 310, during a first time slot 120a, a pre-determined group of nodes 202 in a network 200 simultaneously and independently transmit at pre-determined frequencies 140 their requests for medium access. For example, the transmitting nodes 202 in FIG. 2A transmit.

In step 320, during the same time slot 120a, pre-determined nodes 202 each receive the request of one other node 202. For example, in FIG. 2A pre-determined nodes 202 receive a request on a pre-determined frequency. While FIG. 2A shows all nodes 202 as either transmitting or receiving during the first time slot 120a, this is not required. For example, if the number of nodes 202 in the network 200 is not equal to a power of two, there may be nodes 202 which do not transmit or receive during the first slot 120a.

In step 330, during a second and later time slots (e.g., FIG. 1A, 120b–120j), different nodes 202 act as transmitters and repeaters. For example, referring to FIG. 2B, nodes 202b, 202f, 202j, and 202p are now transmitters and in FIG. 2C nodes 202d and 202l act as transmitters. These nodes 202 transmit their own requests along with the requests of nodes 202 from requests received in the previous time slot. For example, in FIG. 2B, node 202b transmits it own requests with those of node 202a.

In step 340, during the second and later time slots 120, predetermined nodes 202 receive the reservation requests for the respective time slot 120. For example, referring to FIG. 2B, nodes 202d, 202h, 202l, and 202n receive requests for the second time slot 120b.

Steps 330 and 340 repeat until only two nodes 202 have not yet transmitted their requests. In step 350, one of these nodes 202 transmits the last node 202. For example, in FIG. 2D only nodes 202h and 202n are left to transmit. Node 202n transmits to node 202h, which now knows the medium access requests of all the nodes 202 in the network 200.

Then, in step 360, the final node transmits to a base-station 204, in an optional step. For example, node 202h transmits to the base station 204. However, the process 300 is not limited to the last node 202h transmitting to a base station 204. For example, the last node 202h may serve as a master node 202, in which case it processes the requests for medium access.

Next, the base station 204 or master node (e.g. 202h) grants a full or partial grant, in step 370. In one embodiment, the base station 204 transmits a grant along with a table describing the resources which each node 202 has been allocated. If necessary, the table may be compressed.

Alternatively to step 370, the base station 204 (or master node 202h) transmits a grant along with a scaling factor, describing the fraction of the requested resources which have been allocated to the nodes 202, in step 380. In this embodiment, the nodes 202 listen during the reservation process of step 310 through step 350 for sufficient information such that each node 202 is able to determine on it own which resources it will be allocated. The scaling factor is used to cover the possibility that the nodes 202 have collectively asked for more resources than are available. Thus, the base station 204 need not transmit the table of resource allocation.

One embodiment of the present invention compensates for node 202 failure by having each node 202 talk to two or more nodes 202 that are consecutively ahead of it in the reservation process. This is done by having sufficient power level of the transmitter so that the required number of nodes 202 can receive and decode the signaled packet correctly. Another embodiment provides for increasing the power with which nodes 202 transmit as reservation process is further along. This is especially useful in the embodiment in which nodes 202 listen during the reservation process to determine what resources will be allocated to them so that the master node does not have to transmit this information. In this embodiment more nodes are dependent on the information which is transmitted, hence the desire for more power. Another embodiment provides for increasing the coding gain to achieve the same goal.

Group Reservation Scheme

Figure 15A:
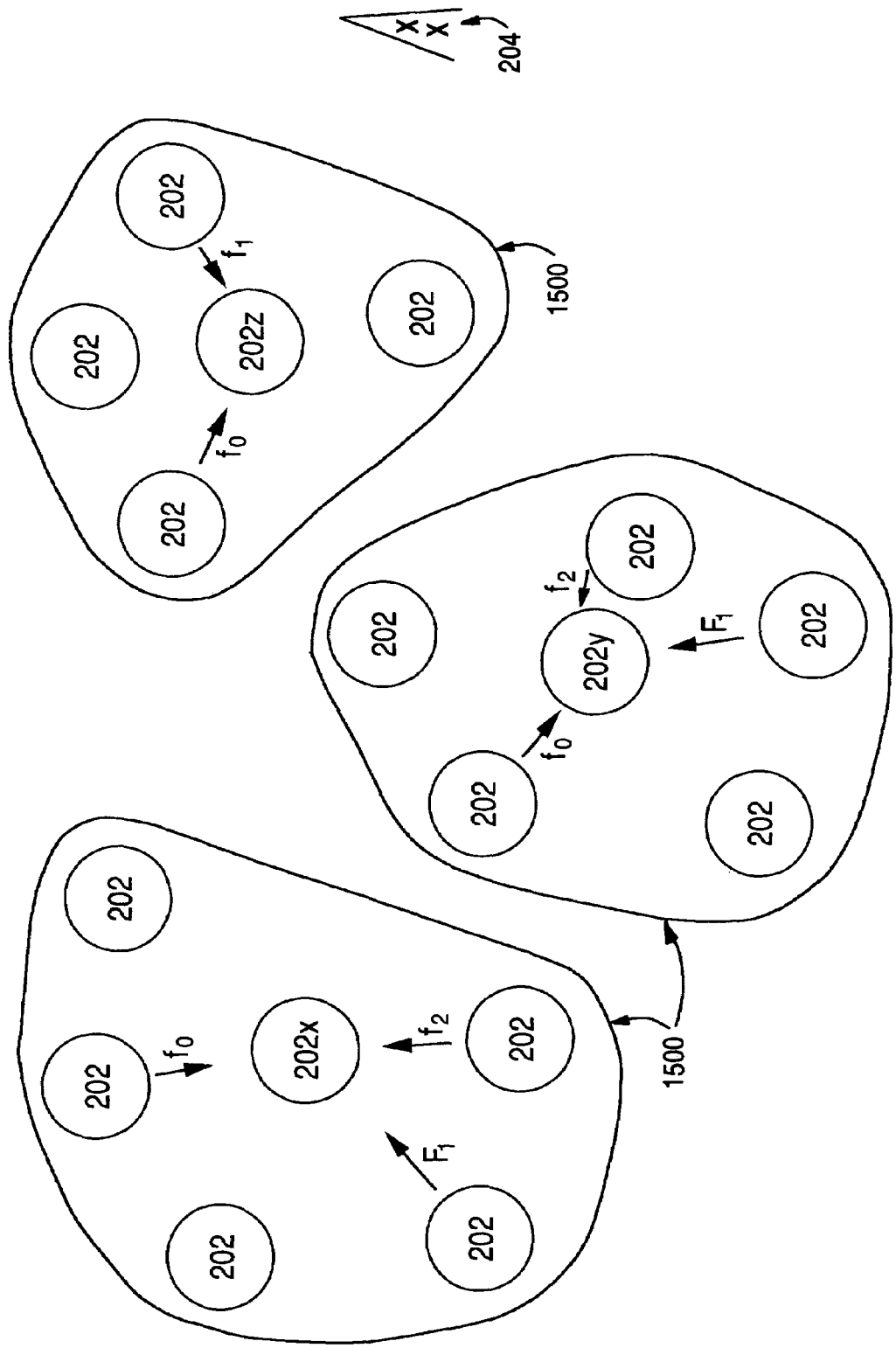
FIG. 15A and FIG. 15B are diagrams illustrating groups of nodes transmitting their requests for medium allocation to a master node, in accordance with embodiments of the present invention.

In another embodiment of a reservation protocol for a network of nodes, the network 200 is divided into a number of groups 1500, as shown in FIG. 15A. A group 1500 may be defined as a set of nodes 202 that are able to send/receive data reliably to/from the group master and an alternate group master. Each group 1500 conducts its own reservation process. Within each group 1500, the nodes 202 each make their requests to their group master node (e.g., 202x, 202y, and 202z), which consolidates the resource requests for group 1500. Preferably, the group master has the highest RF visibility of any node 202 in the group 1500, although this is not required. Within a group 1500, nodes 202 use a shared control channel to send requests on different sub-carriers and different time-slots. A group master node (e.g., 202x) then passes the requests to the next group master node 202y, which passes on to master node 202z, which passes to the base station 204. The base station 204 then allocates resources.

Figure 14:
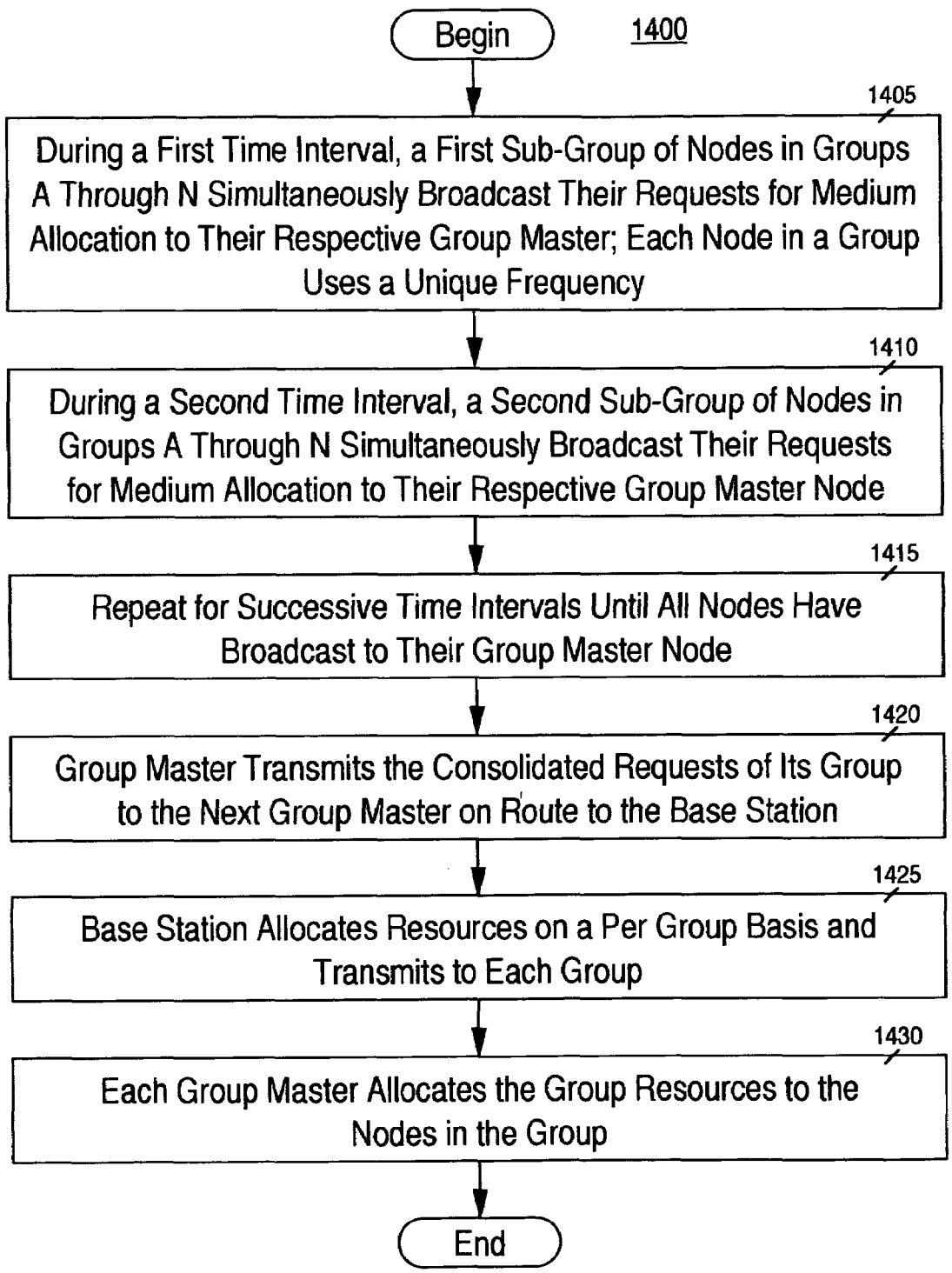
FIG. 14 is a flowchart of the steps of a process of medium reservation in which nodes transmit to a group master node, in accordance with embodiments of the present invention.

Referring now to FIG. 14, a process 1400 of allocating resources in a group environment will be discussed. In step 1405, during a first time slot 120a, a first sub-group of nodes 202 within each group 1500 simultaneously transmit their requests for medium access to the group master node (202x, 202y and 202z). For example, if there are seven available frequencies 140, then up to seven nodes 202 in each group 1500 simultaneously broadcast their request to the master node 202. In FIG. 15A, nodes are transmitting their requests to their respective group master node at frequencies $f_0$, $f_1$, and $f_2$. In this embodiment, only one node 202 in a group 1500 transmits at a given frequency 140, although the same frequency 140 may be used in another group 1500. In this fashion, collisions are avoided.

Figure 15B:
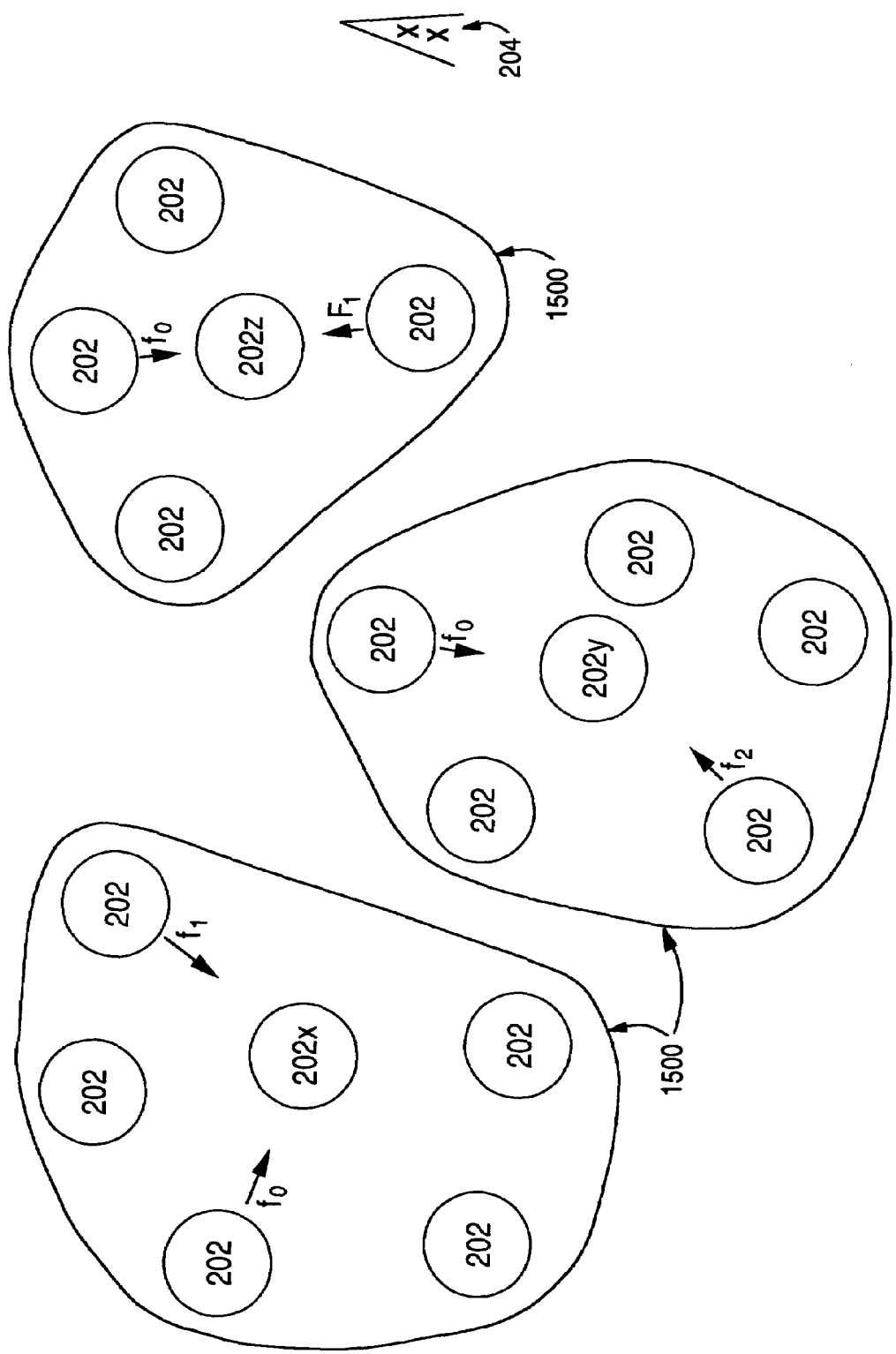

Then, in step 1410, a second subgroup transmits their requests in a similar fashion to step 1405. Referring to FIG. 15B, several nodes 202 are shown transmitting their requests during the second time slot 120b at frequencies $f_0$–$f_2$. At the same time many other groups 1500. which are not shown, may be performing a similar reservation process.

The process 1400 continues for a sufficient number of time slots 120 for all nodes 202 to have an opportunity to transmit their requests, in step 1415. It will be understood that any convenient number of frequencies 140 may be used and that not all nodes 202 must transmit requests during their allotted time slot 120.

After all nodes 202 have has an opportunity to transmit their requests to their group master node 202z, the master nodes consolidate their group's requests and pass them on to the next master node on the way to the base station, in step 1420. This step may be accomplished with group masters transmitting to others simultaneously, if desired. Any suitable path may be taken to get the groups' requests to the base station 204.

Then, in step 1425, the base station 204 allocates resources on a per group basis. This allocation is transmitted to the group masters 202x, 202y, and 202z in any suitable fashion.

When a group master node 202z receives the resource allocation for its group 1500, it divides the resources to individual nodes 202 of its group 1500, in step 1430.

Another embodiment of a group reservation protocol provides for a collision resolution mechanism. A subset of nodes 202 make their requests simultaneously to their group master node using different frequencies 140. In this embodiment, there may be 'n' available frequencies 140 upon which to transmit resource requests, but more than 'n' nodes in the group 1500. Each node 202 is assigned a primary frequency according to Equation 1.

$$p_i \bmod n \qquad \text{Equation 1}$$

Where: $p_i$ is the ith node in the group.

Each node 202 is also assigned a secondary frequency 140 according to Equation 2, which guarantees that if there are less than n nodes 202 assigned to the same primary frequency, they will be assigned to a different secondary frequency 140.

$$(((p_1/n)+p_i \bmod n) \bmod n) \qquad \text{Equation 2}$$

For example, assume n frequencies $f_0$–$f_6$ and m nodes $p_0$–$p_{m-1}$ wherein frequencies $f_0$–$f_6$ may correspond to frequencies 140a–140g. The assigned primary frequency for node $p_{23}$ is (23 mod 7)=2, giving $f_2$ The assigned secondary frequency is ((23/7)+(23 mod 7) mod 7)=5, giving $f_5$.

Figure 13:
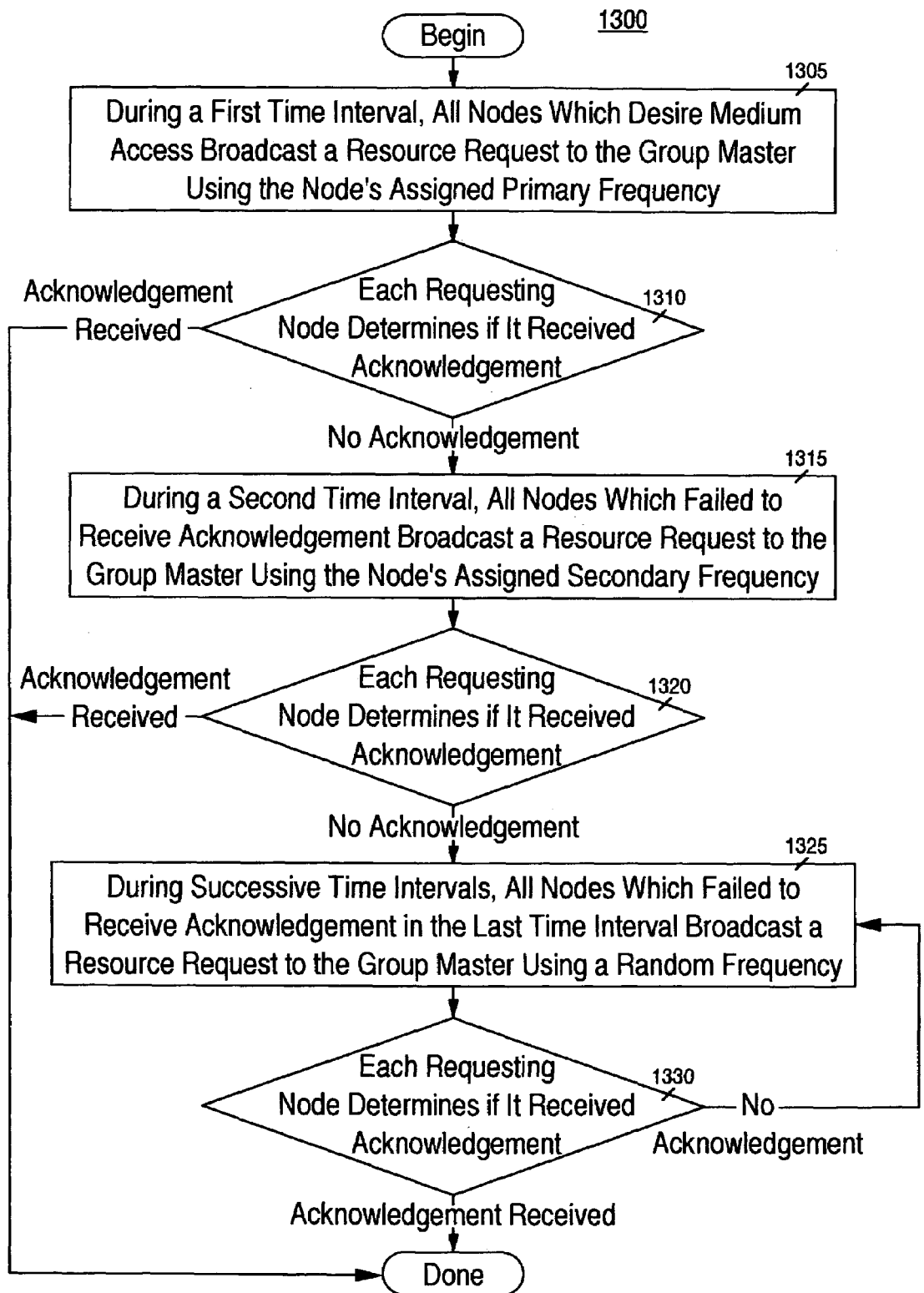
FIG. 13 is a flowchart of the steps of a process of medium reservation using primary and secondary frequencies to avoid collisions, in accordance with embodiments of the present invention.

Referring to FIG. 13, in step 1305, each node 202 that desired medium access broadcasts its resource request to the group master node 202z using its own primary assigned frequency 140. As there may be more nodes 202 than available frequencies 140, each node 202 may not have not a unique frequency 140. However, not all nodes 202 will be broadcasting a request. It is very unlikely that more than one node 202 that shares the same primary frequency 140 will desire medium access simultaneously. In the preferred embodiment, less that ten nodes 202 will share the same frequency 140.

In step 1310, each node 202 determines if its resource request was received by the master node 202z. For example, each node 202 determines whether it received an acknowledgment from the master node 202z. If it did, the process 1300 ends for this node 202, as its request has been received by the master node 202z.

However, it is possible that a collision will occur between two nodes 202 requesting medium access by using the same frequency 140. In this case, step 1315 is taken by nodes 202 which failed to receive an acknowledgment. Thus, during the second time slot 120b each node 202 which has yet to have its resource request heard by the master node 202z, makes a repeated request for medium access using its assigned secondary frequency 140.

Again, each transmitting node 202 determines whether it received an acknowledgment from the master node 202z, in step 1320. If it did, the process 1300 ends for that node 202.

Nodes 202 which do not receive an acknowledgment use a random frequency 140 to re-broadcast their resource request to the group master node 202z, in step 1325.

In step 1330, each node 202 again determines if its request was received by the master node 202z. Steps 1325 and 1330 are repeated until each node 202 has received acknowledgment that its request was received. This embodiment, uses fewer time slots 120 for an arbitrary number of nodes 202 per group 1500 than an embodiment in which nodes broadcast to each other in pairs. Furthermore, a very large percentage of the requesting nodes 202 will be able to communicate their requests during a given frame, wherein there may be, for example, 10 time slots 120 in a frame. This embodiment also reduces the number of failure points for a group to one node 202 (e.g., the group master node 202z).

Group Resource Allocation

In any embodiment in which the nodes 202 are part of a group 1500, the resource allocation may be performed in the following fashion. The base station 204 determines the resource to be allocated to each group 1500, without defining each node's 202 allocation. This allocation is passed back to each respective master node 202, which allocates its group's resources among the nodes 202 in that group 1500.

Adding Nodes to the Reservation Process

Figure 4A:
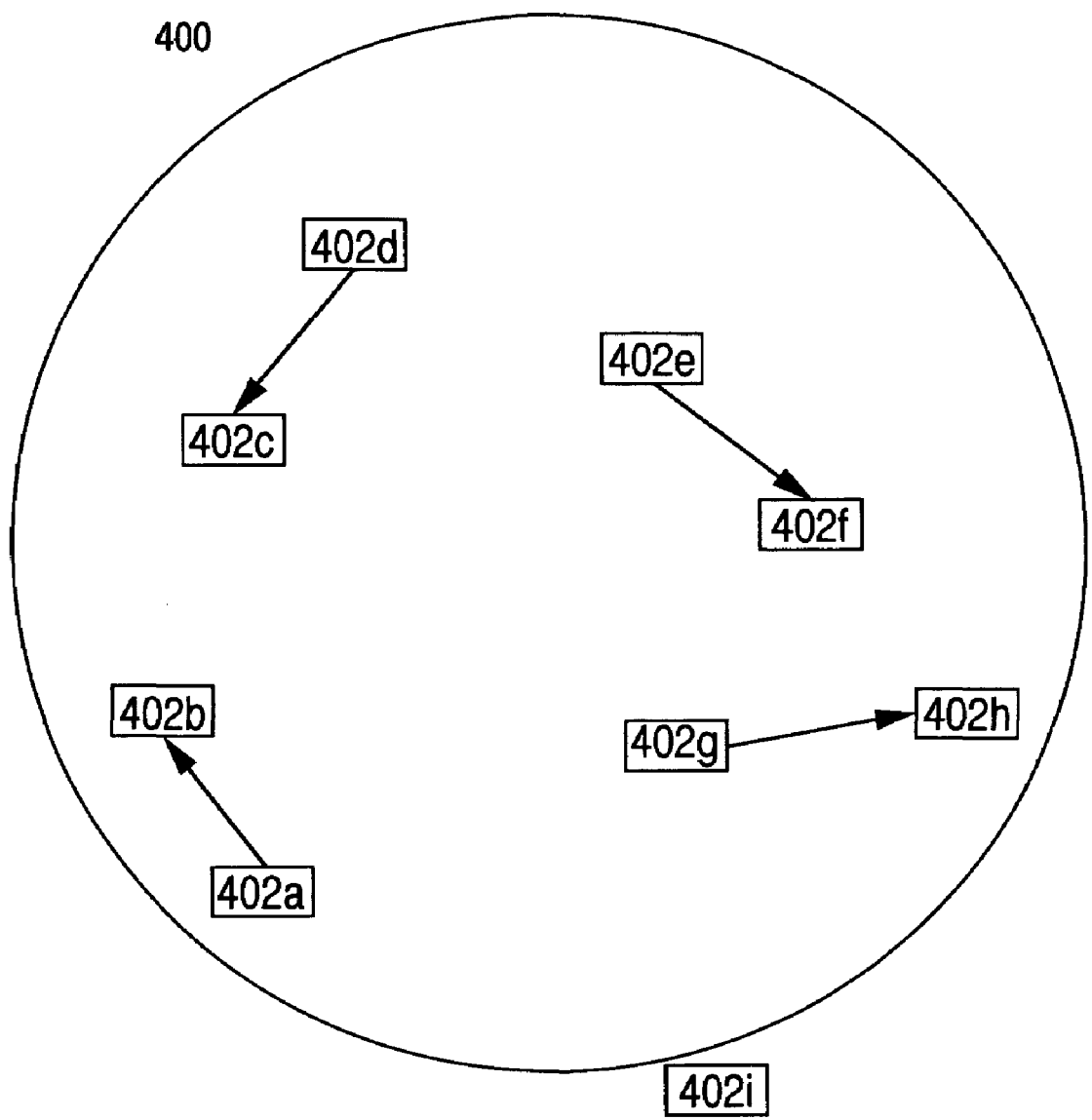
FIG. 4A, FIG. 4B, FIG. 4C, and FIG. 4D are illustrations of a node which is not part of the network taking measurements during the reservation process, according to an embodiment of the present invention.

Some embodiments allow additional nodes 202 to be added to the network 200. For example, the parallel reservation scheme may need to add nodes to the reservation process. However, the group reservation scheme may not need to add nodes to the reservation process. After the parallel reservation process is established for an entire network of nodes 200, a new node 202 may desire to join the network 200. An embodiment of the present invention allows a new node 202 to join the network 200. FIG. 4A through FIG. 4D represent four reservation time slots 120a–120d similar to those of FIGS. 2A through 2D. The tail of the arrows refer to a transmitting node 202 and the head to a receiving node 202. Referring to FIG. 4A, node 402i is not yet a part of the network for reservation purposes. Node 402i listens on each frequency 140 (e.g., $f_A$–$f_G$, 140a–140g) and records the signal strength at which it receives the signal from each node 402. This may require more than one single time slot 120.

Figure 4B:
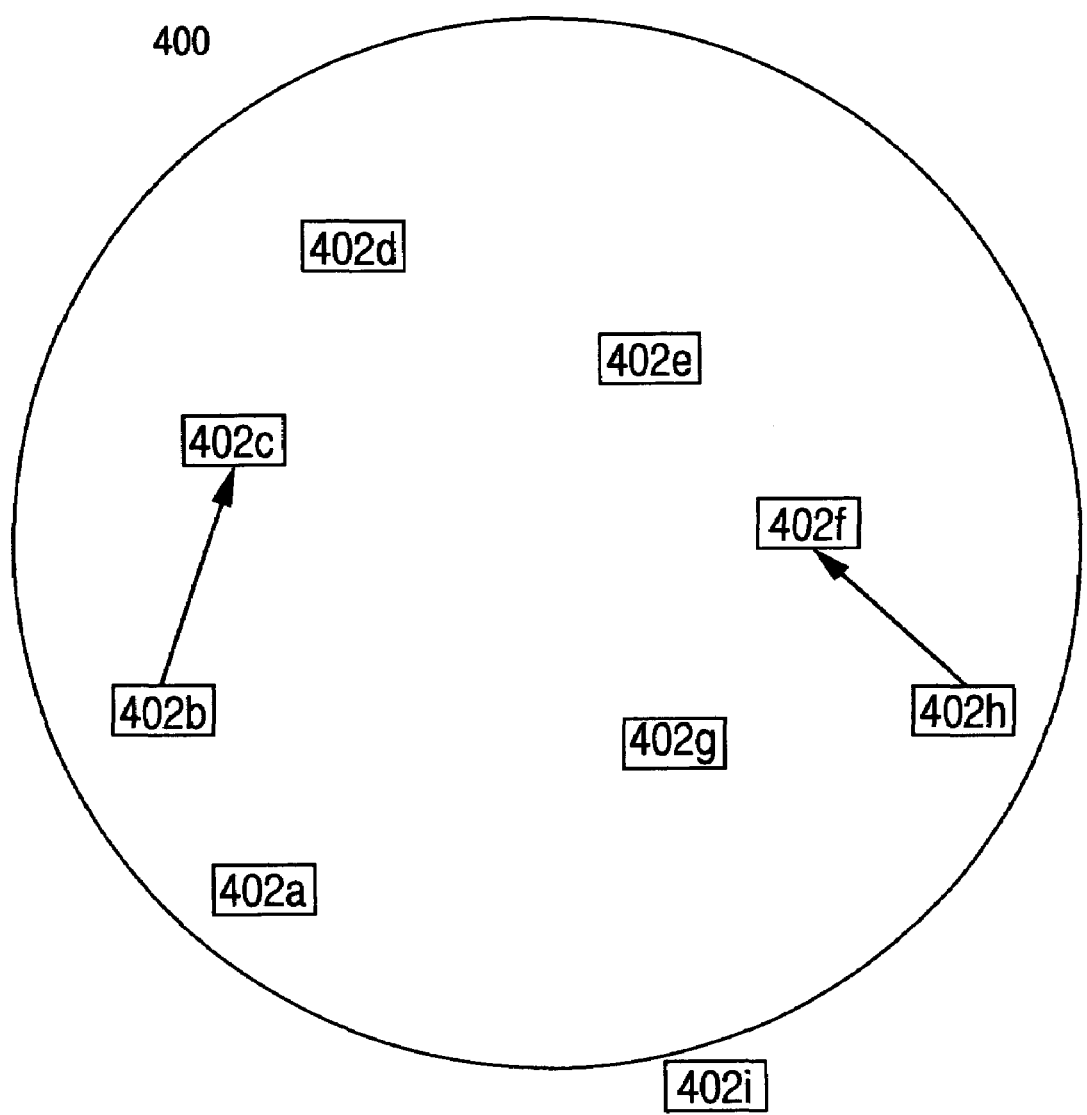
Figure 4C:
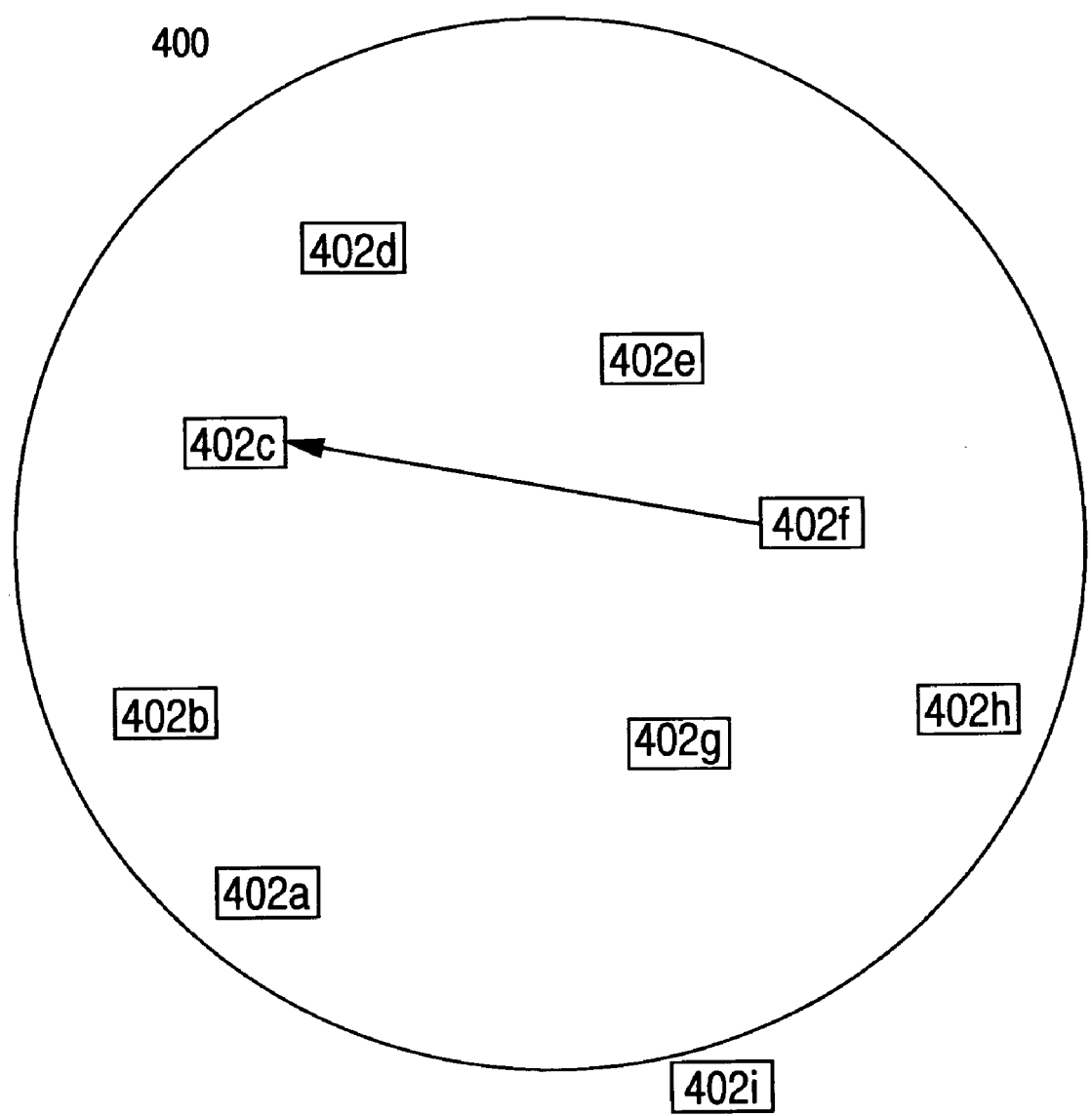
Figure 4D:
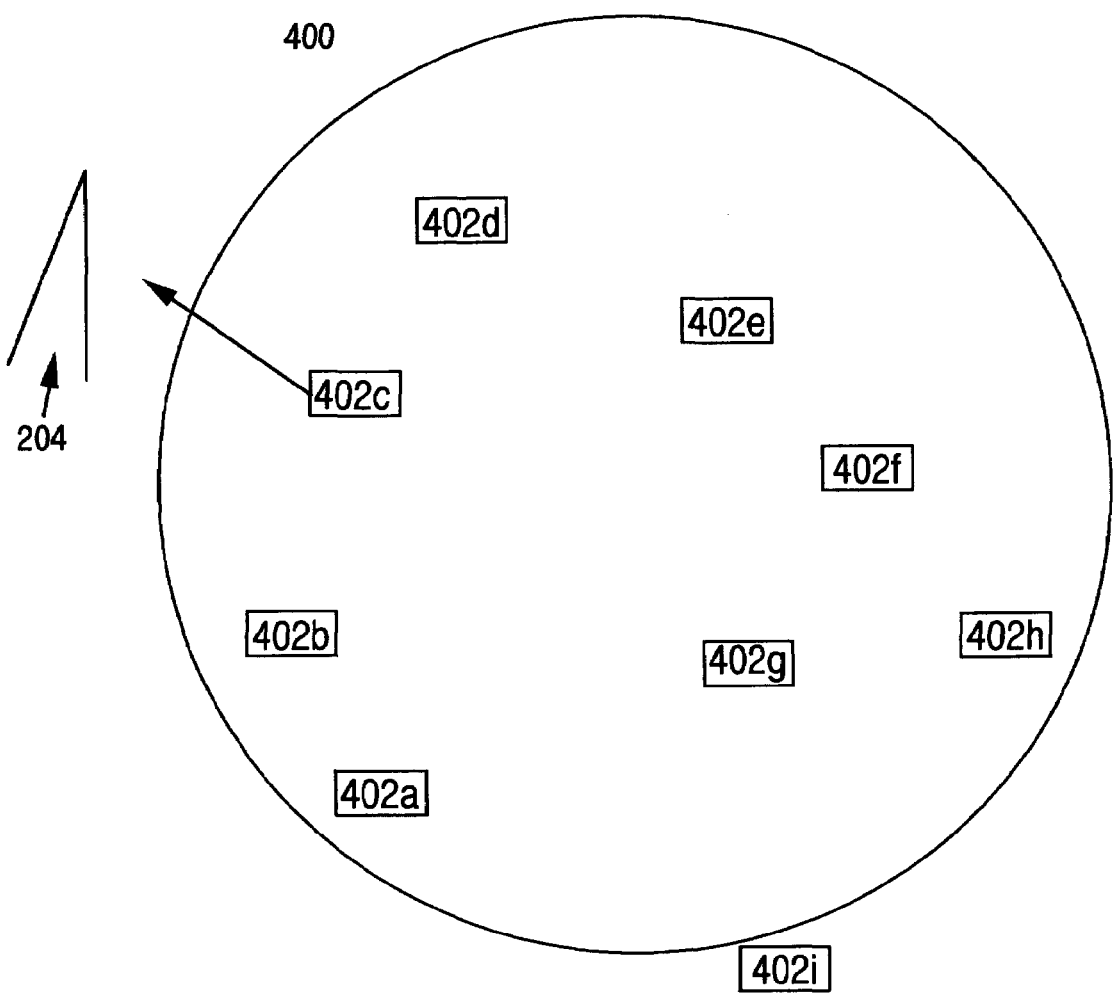

Referring to FIG. 4B, FIG. 4C, and FIG. 4D, node 402i listens on all of a number of pre-determined frequencies 140 during each time slot 120 to determine the power with which the signal from the rest of the nodes 202 is received. Using this information, node 402i builds a table like the one in FIG. 5.

Referring now to FIG. 5, the table 500 reflects that during the first time slot 120a node 402i received a signal from node 402a at a power of −90 dB, received a signal from node 402d at −60 dB, etc. The new node 402i transmits this table to the master node or base station 204. This information is used to determine a new reservation process, for example, which nodes 202 transmit during each time slot 120, at what power and frequency 140, etc.

Figure 6:
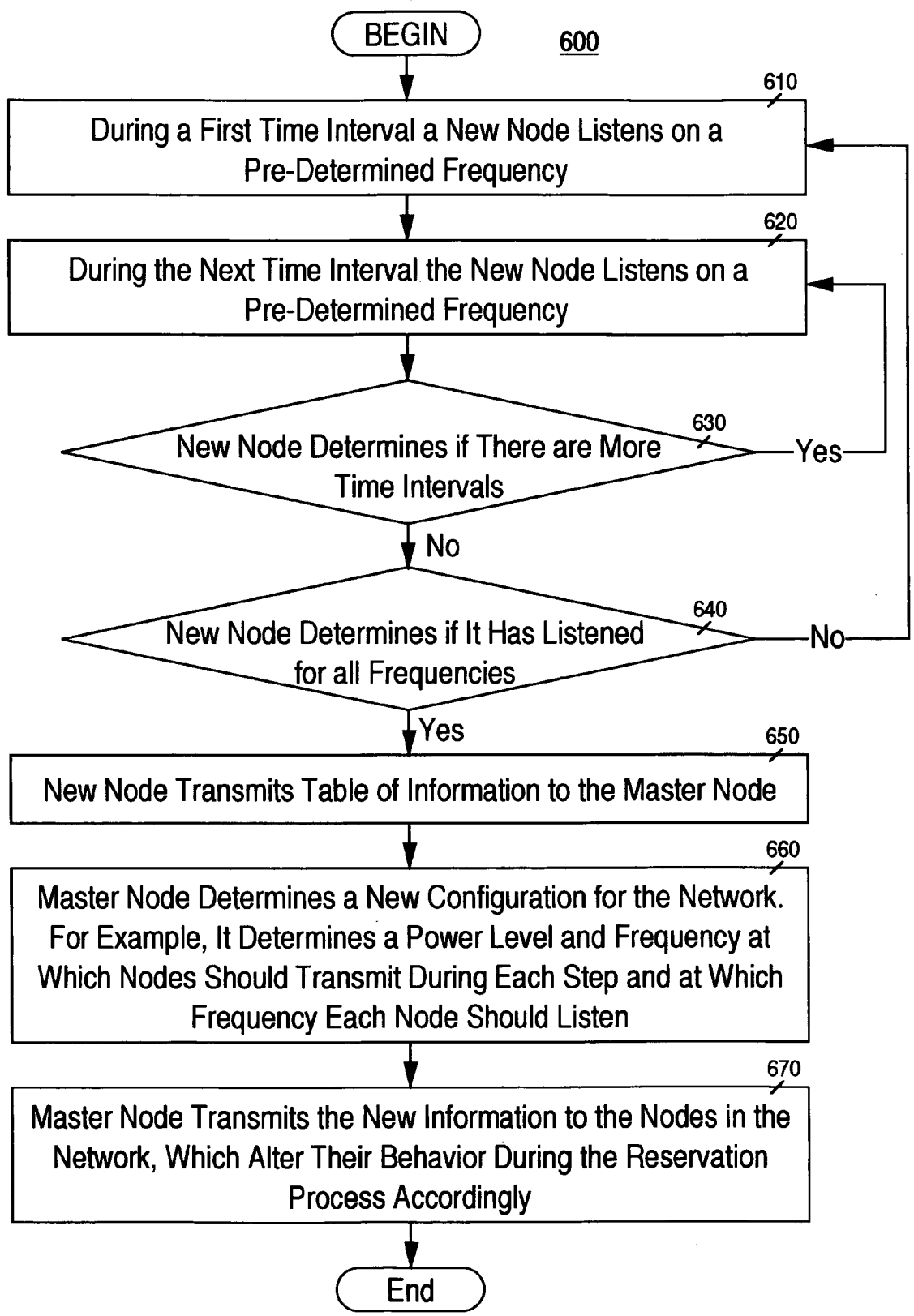
FIG. 6 is a flowchart of the steps of a process of a new node being added to the network of nodes for reservation purposes, according to an embodiment of the present invention.

The flowchart of FIG. 6 describes this process 600. In step 610, the new node 402i listens on a pre-determined frequency (e.g., 140a) during the first time slot 120a. The node 402i will be aware of a number of such predetermined frequencies 140 that may be used. The present invention is not limited to a node 402 listening to a single frequency 140 each time slot 120, however. For example, the node 402i may have capability to listen to multiple frequencies 140 simultaneously. Additionally, the new node 402*i* may be required to be synchronized in time and frequency with the network 400 to facilitate this process.

In step 620, a new time slot 120*b* has been entered. The new node 402*i* may listen at the same frequency (e.g., 140*a*) as it did in step 610. It will again note the signal power.

The new node 402*i* listens at this frequency 140*a* until all time slots 120 are over. The new node 402*i* may determine this in any suitable fashion, for example, by listening for a pre-determined number of time slots 120. However, the present invention is not limited to this method of determining that all nodes in the network have been listened to.

The new node 402*i* then determines whether it has listened on all possible frequencies 140. For example, in one embodiment seven frequencies 140 are used. The process 600 returns to step 610 until all frequencies 140 have been covered.

When the node 402*i* has listened on all frequencies 140 for all time slots 120, the node 402*i* transmits its table to the master node 202, in step 650.

In step 660, the master node 202 determines a new configuration for the network 400. In so doing, it factors in the data from all of the nodes 402, to determine which nodes 400 should transmit during each time slot 120. Furthermore, it determines that power level and frequency 140 each transmits at. Additionally, it determines which nodes 402 are listening during each time slot 120 and at what frequency 140. One factor in this determination may be the pairing of nodes 402 which are either physically close to one another or close in an electromagnetic propagation sense. In this fashion, nodes 402 may transmit to a partner at a relatively low power level, as they may be close together. However, the present invention is not limited to this method of pairing nodes 402.

In step 670, the master node 202 transmits the new information, which all of the nodes 402 use to ascertain their own new role in the parallel reservation process.

Determining the Reservation Order

Figure 10:
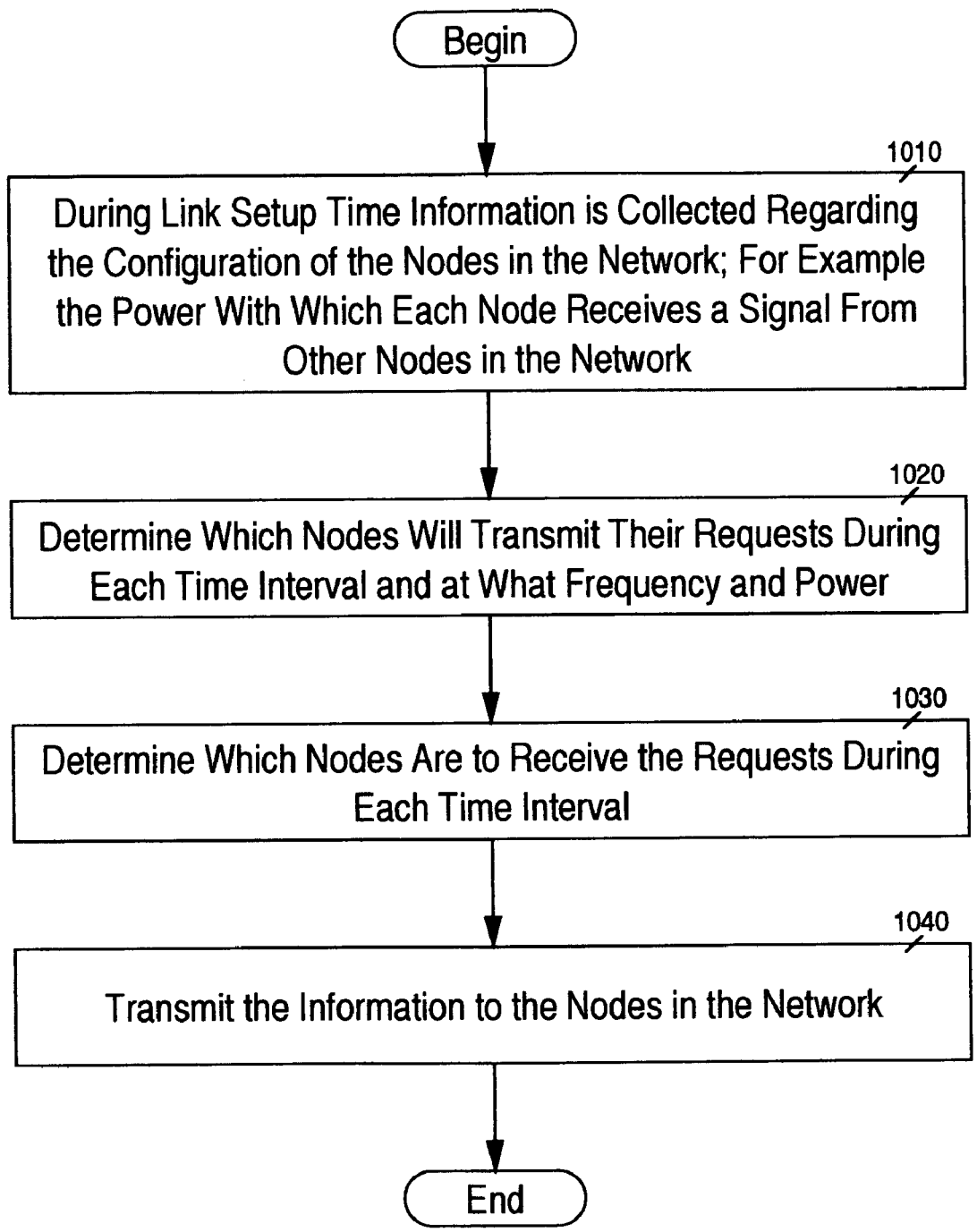
FIG. 10 is a flowchart illustrating the steps of a process of determining how the reservation process will proceed, in accordance with embodiments of the present invention.

Before the parallel reservation process take place, the physical parameters of the network 200 are established, so that the medium access reservation protocol may proceed efficiently. This information may be used to build a table such as the one in FIG. 7 and may be done at link setup time. Referring to the flowchart in FIG. 10, one embodiment provides for such a process. In step 1010, information is collected regarding the configuration of the nodes 202 in the network 200. For example, each node 202 determines the power with which it receives a signal from each other node 202 in the network 200.

In step 1020, a master node or base station 204 determines which nodes 202 will transmit their requests during each time slot and at what frequency and power. In step 1030, the master node or base station 204 determines which nodes 202 are to receive the requests during each time slot 120. In step 1040, the information is transmitted to the nodes 202 in the network 200.

The new information which the master node transmits may be similar to the table of FIG. 7. For time slot 1, Node 402*a* has a value of 10 dB and frequency A 140*a*. Thus, node 402*a* knows to transmit at this frequency 140*a* during the first time slot 120*a*. The power level is chosen such that the listening node (e.g., 402*b*) will receive the signal clearly, but it is not so high as to interfere with more distant nodes 402 that may be listening at the same frequency 140*a*. The same table 700 (or a separate table 700) may also specifies simply a frequency 140 during time slot 120*a* for node 402*b*. This indicates that node 402*b* should listen at frequency 140*a* and will thus receive the signal from node 402*a*.

Resource Reallocation

Figure 8:
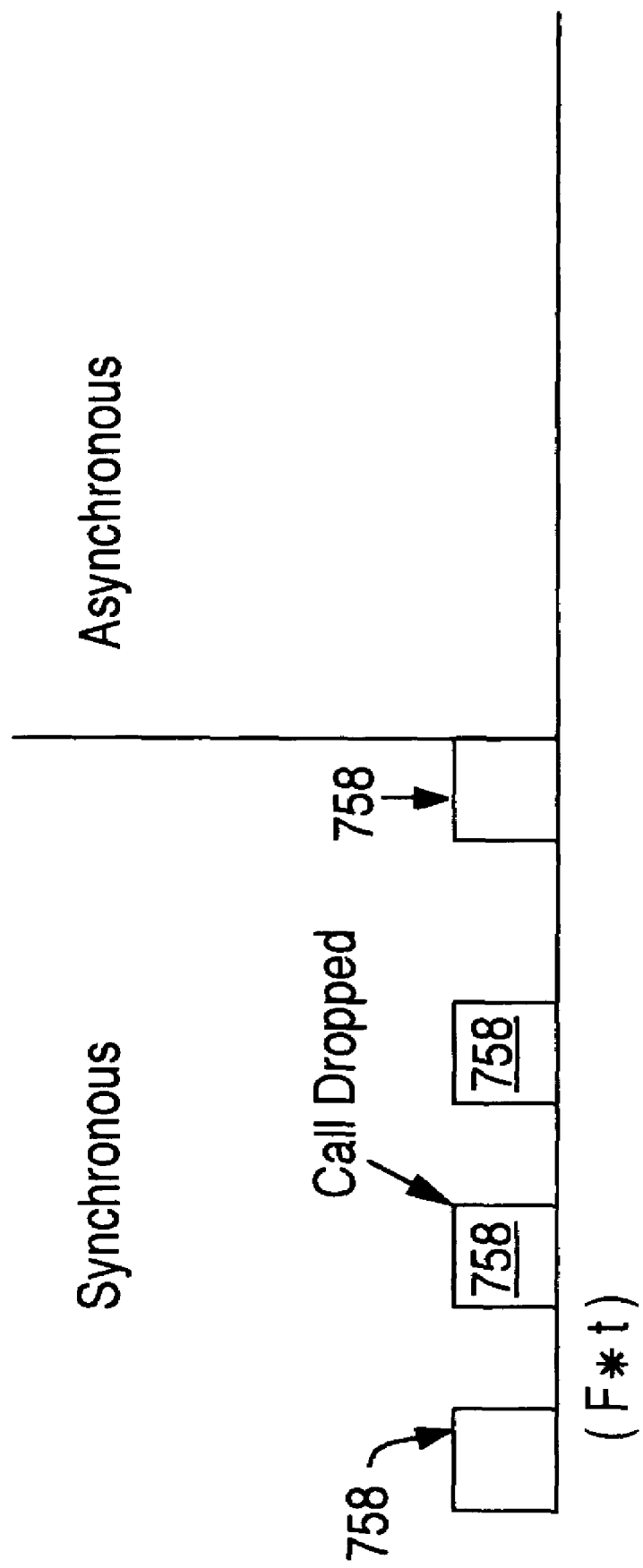
FIG. 8 is a diagram illustrating asynchronous resources being re-configured in response to changes in synchronous resource use, according to an embodiment of the present invention.

In order to more efficiently use resources, one embodiment reallocates resources if synchronous resources which were being used are freed up. For example, referring to FIG. 8, the resource space 150 has been reorganized from a two-dimensional space to a single dimension by multiplying time by frequency. If a synchronous resource 758 is freed up (for example, a call ends), then the resources to the right may be moved to the left. A master node 202 may keep track of such usage and signal the nodes 202 to reallocate their resources.

The Network Stream

Figure 9:
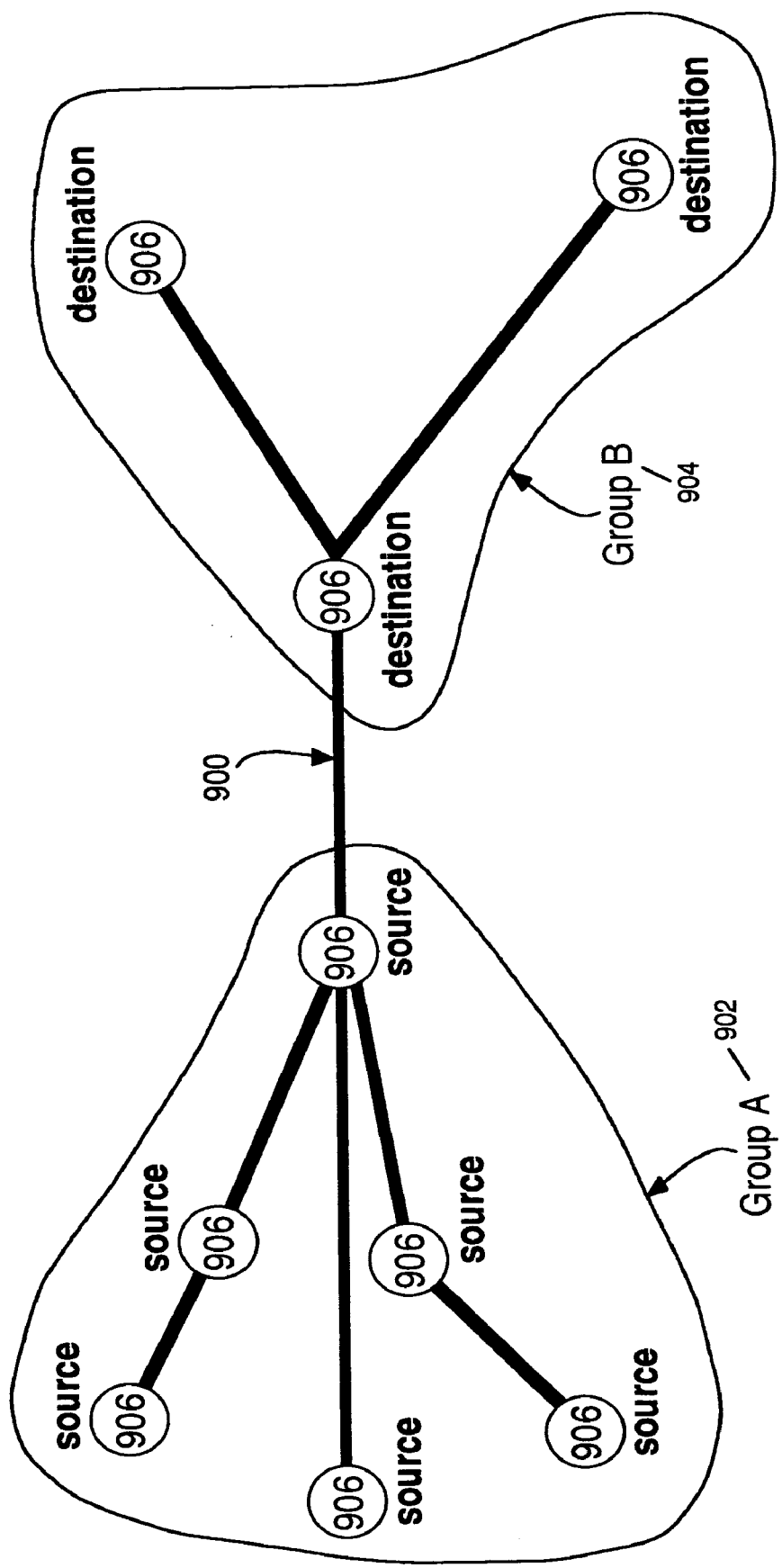
FIG. 9 is a diagram of a network of nodes which form a stream and share the same medium, according to an embodiment of the present invention.

Referring now to FIG. 9, a stream 900 consists of all nodes 202 that share a common link on which the MAC reservation protocol algorithm works. Element 906 refers to a node 202 or a group of nodes 202. If the Group A 902 to Group B 904 link is shared by N nodes 202, the stream 900 consists of N nodes 202. A stream 900 is the largest set of such nodes 202. In one embodiment, all traffic is to and from a base station 204 (e.g., an Internet Access Point (IAP)). For this embodiment, every stream 900 ends (or begins) with the IAP since all nodes 202 will be talking with the IAP. In another embodiment, there may be local traffic; therefore, a stream 900 could terminate or start with any group. All nodes 202 in the stream 900 share the bandwidth on the common resource that defines them. For the embodiment in which the IAP is the termination point, the data rate that the stream 900 can support is 50×R Mbps where R is the co-channel reuse factor. The co-channel re-use factor arises from a coherent beam forming process described in co-pending U.S. patent application Ser. No. 09/828,349, now U.S. Pat. No. 6,785,513, concurrently filed herewith entitled, "Method and System for Clustered Wireless Networks", by Sivaprakasam. Several frequency bands can exist within one sector of the base station (IAP) which then further increases the capacity of the stream 900 to be 50×R×F where F frequency bands can be utilized in the sector (each band may support 50 Mbps, e.g., 5 OFDM signals). A single reservation protocol ring exists in a stream 900. Thus, all nodes 202 in that stream 900 request bandwidth from the same medium.

In one embodiment, the reservation itself is done one OFDM symbol ahead of time. Thus, the system incurs about a millisecond extra delay. The reason to indicate the usage of bandwidth ahead of time is twofold. Firstly, it allows other co-channel separable signals to be transmitted simultaneously. This also means that the base station 204 will be able to use multi-user detection and spatial processing algorithms to separately decode those signals. Secondly, it also allows for an error recovery system to exist.

In a single stream 900 there could exist several co-channel interfering signals that get separated at the IAP or the termination point of the stream 900. One embodiment allows only select combinations of separable nodes 202 by using reservation indications made a symbol ahead of time. For example, if there are 10 separable nodes 202 (and separable signals) in a particular separable node set, when the single node 202 makes a reservation, that is indicated to all the nodes 202 in the set and also to the base station, one symbol ahead of time. All the nodes 202 in the set will then transmit information simultaneously during the reserved time. Thus all nodes 202 are chained to use the allocated bandwidth if needed (of course a node 202 might choose not to transmit if it has no information content to send, in which case the base station 204 will detect no signal from that node 202).

The reservation is done for the whole node set rather than a single node 202. The actual participation in the reservation ring is done by the node 202 that requires the most bandwidth. In order to reduce the variance of the bandwidth needs of the nodes 202, the node set might be defined dynamically to minimize bandwidth that is wasted due to nodes 202 needing data rates significantly less than the reserving node 202.

Data Forwarding Through Wireless Hops

Figure 18:
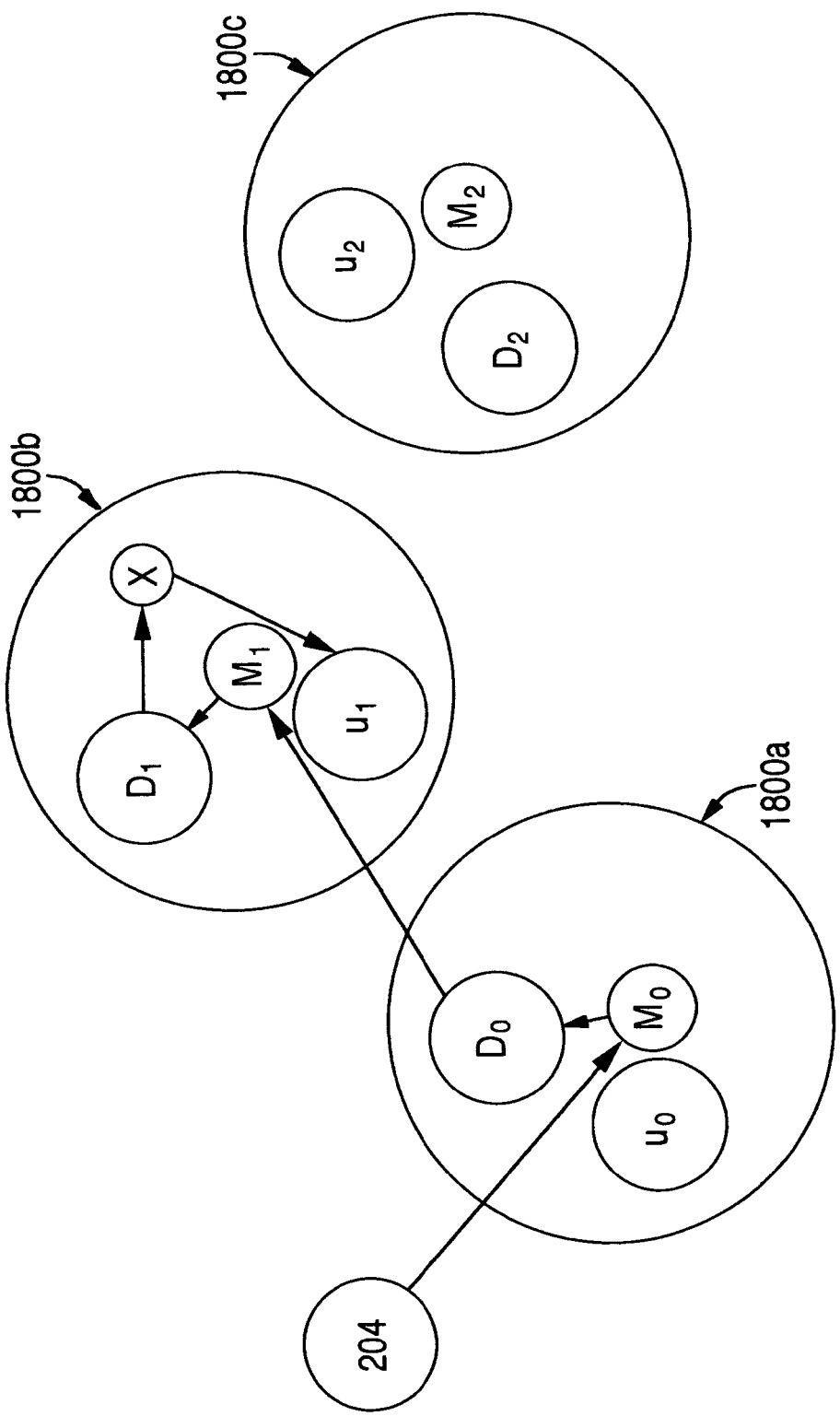
FIG. 18 is a diagram illustrating downstream data packet flow, in accordance with embodiments of the present invention.

Referring now to FIG. 18, the wireless network is organized into groups of nodes 202 that form multi-hop wireless paths away from the base-station 204. The network topology is fixed and every node 202 in the network has a fixed route to/from the IAP 204. A route refers to the hops a data packet has to go through to get to its destination.

Still referring to FIG. 18, the downstream flow of data packets through several groups is illustrated. Data packets hop from group 1800 to group 1800 to reach their destination. Figure shows only the downstream portion of a stream, but both upstream and downstream data are simultaneously routed through the network 200 using different sets of frequency sub-carriers. Each node/group in the network 200 works in a half-duplex mode, i.e. each node/group can only transmit or receive at any instant in time.

A data packet that needs to be sent from the base station 204 to a node X in group 1800b would first be sent to the master node in group 1800a (M0), then sent from M0 to a down-stream repeating subset of group 1800a (D0), then from D0 to the master of group 1800b (M1), then from M1 to a down-stream repeating subset of group 1800b (D1), then from D1 to node X. Similarly, a data packet from node X to the base station 204 would be sent to an upstream repeating subset of group 1800b (U1), then from U1 to M0, then from M0 to an upstream repeating subset of group 1800a (U0), the from U0 to the base station 204. A coherent repeating algorithm which may be used is described in co-pending U.S. patent application Ser. No. 09/828,349, now U.S. Pat. No. 6,785,513, concurrently filed herewith, entitled, "Method and System for Clustered Wireless Networks", by Sivaprakasam, and assigned to the assignee of the present invention.

To coordinate upstream and downstream traffic through the network 200 with half-duplex nodes, each group master needs to receive transmissions from other repeating subgroups in upstream and downstream directions. Each group master also needs to forward the data packets to be repeated in upstream and downstream directions to the appropriate repeating sub-groups.

Simultaneous upstream and downstream communication through the network 200 is coordinated on the network 200 using a Receive-Transmit protocol. For example, consider a group $G_i$ in the network 200 that transmits data in both upstream and downstream directions. The master node of this group is $M_i$, the downstream and upstream repeating sub-groups are $D_i$ and $U_i$ respectively.

An embodiment of the Receive-Transmit protocol followed by the master nodes and repeating sub-groups are given below. The table of FIG. 17, uses the following notations: Tu—Transmit upstream, Td—Transmit downstream, Rd—Receive downstream, Ru—Receive Upstream, T—Transmit upstream and downstream (Tu+Td), R—Receive upstream and downstream (Ru+Rd).

The table of FIG. 17 shows 12 time slots of the cycle with the cycle repeating every 6 time slots (3 phase cycle). Groups are classified into odd and even groups based on the number of hops away from the base station 204. Odd and even groups use different phases of the Transmit-Receive cycle.

Even groups take one frame to forward packets in any direction. Still referring to FIG. 17, the even master nodes (e.g., $M_{i-2}$) receive from adjacent repeaters, transmit packets to its repeaters (both upstream and downstream) and are then idle. The up and down repeaters sequence is idle, receive from its master, and then transmit to adjacent masters. Odd groups take two frames to forward packets in any direction. The sequence for the odd masters is idles, transmit packets to its repeaters (both upstream and downstream), receive from adjacent repeaters. The upstream and downstream repeaters transmit to adjacent masters, receive from its master, then are idle. This scheme allows the same repeaters to be used for both upstream and downstream repeating. It also allows for simultaneous upstream and downstream communication without interference within a group.

Supported Data Links

Figure 12:
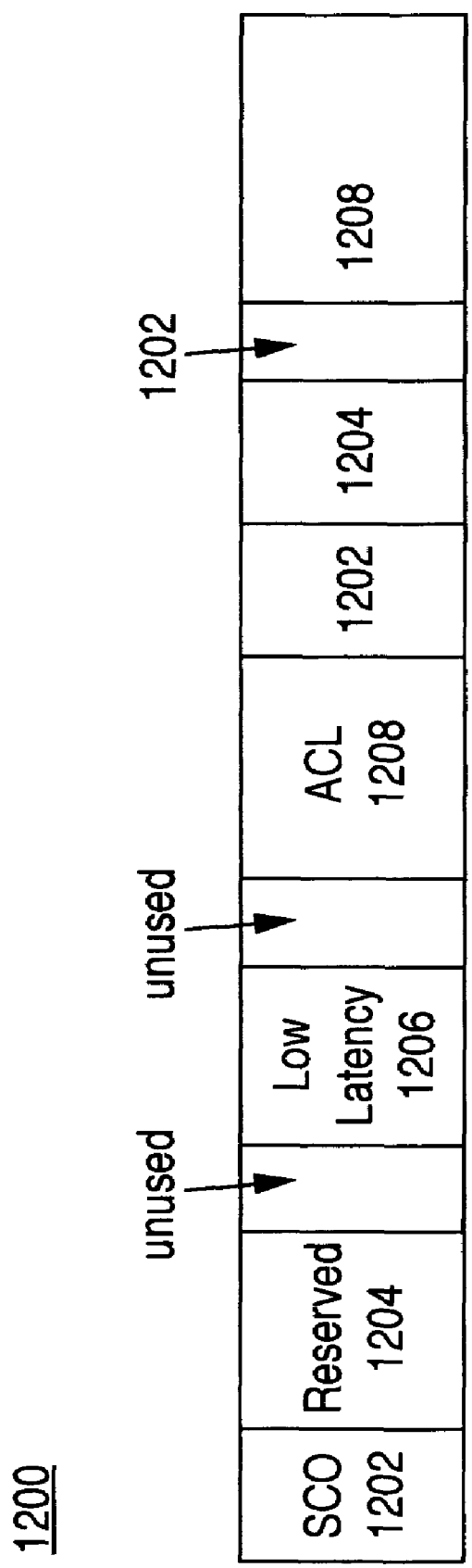
FIG. 12 is a diagram of an exemplary resource line, in accordance with embodiments of the present invention.

There are several types of data links supported by the MAC layer, consistent with quality of service requirements in the network 200. Referring to the exemplary resource line of FIG. 12, these data links can be classified broadly as Synchronous Connection Oriented (SCO) 1202 and Asynchronous Connection-Less (ACL) 1208 links. SCO links 1202 typically carry voice (VoIP) data that need to guarantee latency below a threshold. ACL links 1208 have no such guarantee. Other types of data links can be supported as well. These include low latency data links 1206 that are not synchronous in operation but still need some guarantee on latency (e.g., an average latency requirement rather than per packet). These would come in between SCO 1202 and ACL links 1208. There may be links for various reserved wavelets 1204 as well.

Certain applications need guaranteed bandwidth through the network 200. Bandwidth guarantee may be achieved in at least two ways. Firstly, for all such links, bandwidth can be symmetrically taken from all unguaranteed links up to a certain threshold (below which no link can be supported). Secondly, by redefining the dynamic node sets, one can achieve lower variance on the bandwidth requirement and thereby increasing the system capacity. This in turn can free up enough bandwidth to the system that a guarantee can be made on the required link.

Exemplary Computer Platform

Figure 11:
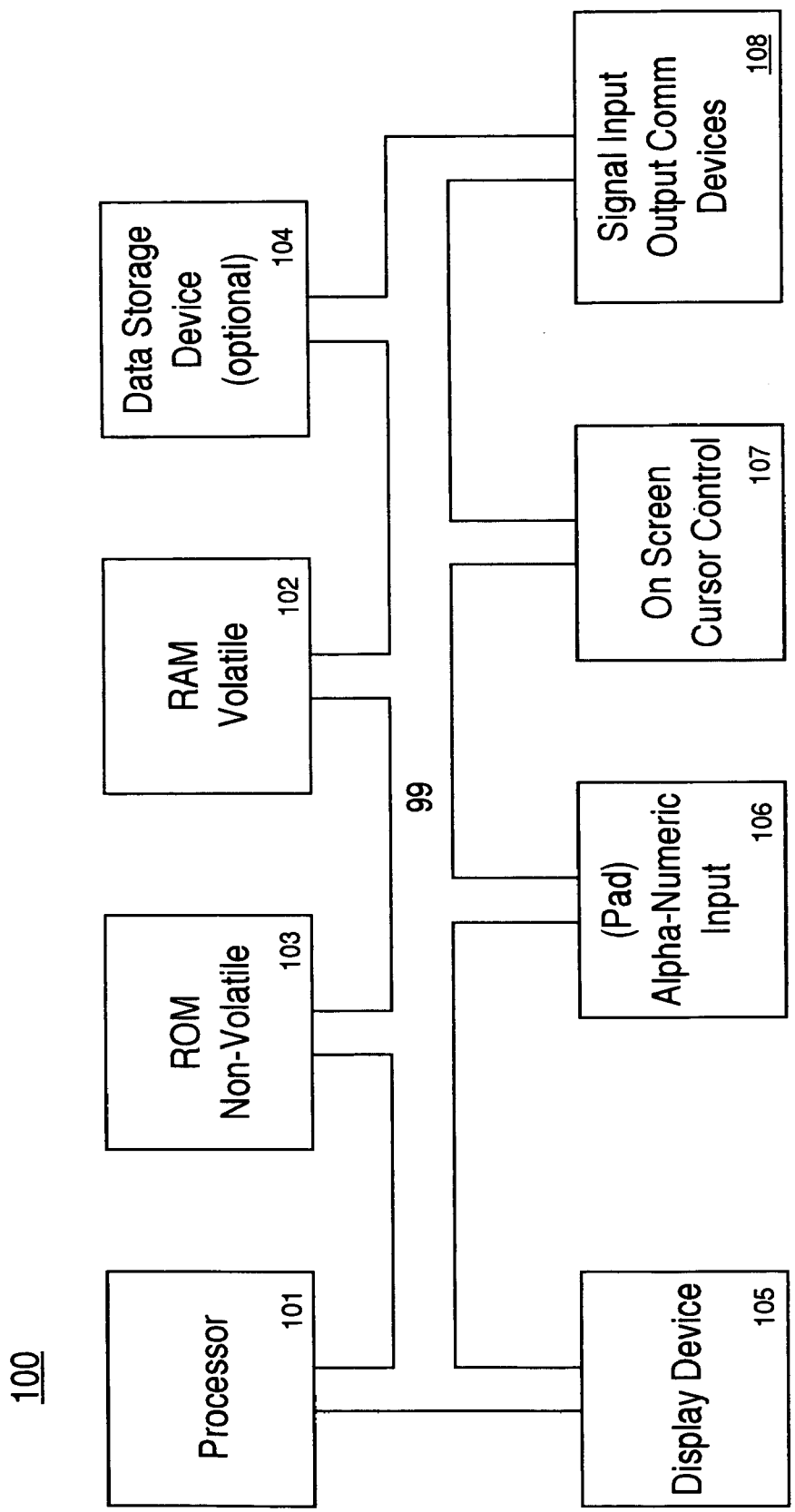
FIG. 11 is a schematic diagram of an exemplary computer system upon which portions of the present invention may be practiced, in accordance with embodiments of the present invention.

With reference now to FIG. 11, portions of the present method for a parallel medium reservation scheme are comprised of computer-readable and computer-executable instructions which reside, for example, in computer-usable media of a computer system. FIG. 11 illustrates an exemplary computer system 100 used to perform the method in accordance with one embodiment of the present invention. It is appreciated that system 100 of FIG. 11 is exemplary only in that the present invention can operate within a number of different computer systems including general purpose networked computer systems, embedded computer systems, and stand alone computer systems. Additionally, computer system 100 of FIG. 11 is well adapted having computer readable media such as, for example, a floppy disk, a compact disc, and the like coupled thereto. Such computer readable media is not shown coupled to computer system 100 in FIG. 11 for purposes of clarity.

System 100 of FIG. 11 includes an address/data bus 99 for communicating information, and a central processor unit 101 coupled to bus 99 for processing information and instructions. Central processor unit 101 may be an 80×86-family microprocessor. System 100 also includes data storage features such as a computer usable volatile memory 102, e.g. random access memory (RAM), coupled to bus 99 for storing information and instructions for central processor unit 101, computer usable non-volatile memory 103, e.g. read only memory (ROM), coupled to bus 99 for storing static information and instructions for the central processor unit 101, and a data storage unit 104 (e.g., a magnetic or optical disk and disk drive) coupled to bus 99 for storing information and instructions.

With reference still to FIG. 11, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A communication input/output device 108 is coupled to bus 99 and allows an interface with I/O devices.

Therefore, it will be seen that embodiments of the present invention allow a method for allocating resources in a large distributed network, which share a medium. Embodiments of the present invention do not have a high overhead. Embodiments of the present invention work well for a network with considerable upstream traffic. Furthermore, embodiments of the present invention provide such a method which, while providing for asynchronous reservations, allows for synchronous traffic as well.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a network of nodes sharing a medium, a method of reserving access to said medium, said method comprising the steps of:
   a) during a first time interval, a first plurality of nodes in said network each transmitting a request for medium allocation;
   b) during said first time interval, a second plurality of nodes in said network each receiving one of said requests from said step a);
   c) during a second time interval, a first group of said second plurality of nodes transmitting a request for their own medium allocation plus the medium allocation specified in the received request from said step b);
   d) during said second time interval, a second group of said second plurality of nodes each receiving one of said requests from said step c); and
   e) in further time intervals, pre-determined nodes transmitting requests and pre-determined nodes receiving requests until all nodes have transmitted their requests.

2. The method of claim 1 wherein said step b) comprises the step of:
   b1) a node in said second plurality of nodes receiving said request from a node to which it is paired on a basis of physical location.

3. The method of claim 1 wherein said step b) comprises the step of:
   b1) a node in said second plurality of nodes receiving said request from a node to which it is paired on a basis of transmission path characteristics.

4. The method of claim 1 wherein said step b) comprises the step of:
   b1) a node of said second plurality listening for said request from a node from said first plurality on a pre-determined frequency.

5. The method of claim 1 wherein said step a) comprises the step of:
   a1) a node of said first plurality transmitting said request on a predetermined frequency.

6. The method of claim 1 wherein said step a) comprises the step of:
   a1) a node of said first plurality transmitting said request at a predetermined power.

7. The method of claim 1 further comprising the steps of:
   f) a new node that is not part of said network determining a received signal strength from said nodes in said network at the location of said new node;
   g) said new node transmitting said determinations to a master node; and
   h) said master node using said data from said new node to determine which nodes of said network of nodes and said new node transmit during each of said time intervals.

8. The method of claim 7 wherein said step f) comprises the steps of:
   f1) said new node listening at a first frequency to determine a signal strength of a node in said network of nodes;
   f2) repeating said step f1) for each of said time intervals; and
   f3) repeating said step f2) for every other frequency being used, wherein the signal strength at the location of said new node for each of said plurality of nodes in said network is determined.

9. The method of claim 7 further comprising the step of:
   i) said master node using said data from said new node to determine a power and frequency at which each of said plurality of nodes transmits when making a request for medium allocation.

10. The method of claim 1 further comprising the steps of:
    f) a node granting said requests; and
    g) said node transmitting an indicator of the resources to which each node of said network has been allocated.

11. The method of claim 1 further comprising the steps of:
    f) a node transmitting a scaling factor; and
    g) a node in said network scaling its request for medium allocation by said scaling factor.

12. A method of reserving medium access for a network comprising a plurality of nodes, said method comprising the steps of:
- a) during a first time interval, pre-determined nodes each transmitting a request for resource allocation;
- b) during said first time interval, pre-determined nodes each receiving one of said requests transmitted from said step a);
- c) during a second and later time intervals, pre-determined nodes of said nodes which received requests in the previous time interval transmitting a request for its own resource allocation plus the resource allocation specified in the received request from a previous time interval;
- d) during said second and later time intervals, pre-determined nodes of said nodes which received requests in the previous time interval receiving requests from nodes transmitting in this time interval;
- e) repeating said step c) and said step d) until there are two nodes yet to transmit; and
- f) one of said two nodes from said step e) transmitting its requests to the other node, wherein the last receiving node knows the resource allocation requests of all nodes of said network.

13. The method of claim 12 further comprising the steps of:
- g) dividing a resource space comprising frequency and time division into packets;
- h) assigning an order to each node in said network;
- i) assigning an order to said resource packets; and
- j) assigning the resource packets to the nodes in corresponding order.

14. The method of claim 13 further comprising the step of:
- k) a node listening to the requests of other nodes to determine which of said resource packets will be allocated to it.

15. The method of claim 14 further comprising the steps of:
- l) a master node transmitting a scaling factor; and
- m) a node in said network scaling its request for resources by said scaling factor.

16. The method of claim 13 further comprising the steps of:
- k) a master node granting said requests; and
- l) said master node transmitting information describing the resources packets to which each node has been allocated.

17. The method of claim 12 wherein said step c) comprises the step of:
- c1) increasing a coding gain with each successive time interval.

18. The method of claim 12 wherein said step c) comprises the step of:
- c1) said nodes transmitting with increasing power levels with each successive time interval.

19. The method of claim 12 wherein said step d) comprises the step of:
- d1) more than one of said nodes in said network receiving said requests for said resource allocation.

* * * * *